(12) United States Patent
Nakamura

(10) Patent No.: US 10,232,909 B2
(45) Date of Patent: Mar. 19, 2019

(54) BICYCLE OPERATING DEVICE

(71) Applicant: Shimano Inc., Sakai, Osaka (JP)

(72) Inventor: Tsuyoshi Nakamura, Osaka (JP)

(73) Assignee: Shimano Inc., Osaka (JP)

( * ) Notice: Subject to any disclaimer, the term of this patent is extended or adjusted under 35 U.S.C. 154(b) by 236 days.

(21) Appl. No.: 15/450,759

(22) Filed: Mar. 6, 2017

(65) Prior Publication Data

US 2018/0251192 A1    Sep. 6, 2018

(51) Int. Cl.
| | | |
|---|---|---|
| *B62M 25/04* | (2006.01) | |
| *B62K 23/06* | (2006.01) | |
| *F16H 31/00* | (2006.01) | |
| *F16C 1/12* | (2006.01) | |

(52) U.S. Cl.
CPC ............. *B62M 25/04* (2013.01); *B62K 23/06* (2013.01); *B62M 25/045* (2013.01); *F16C 1/12* (2013.01); *F16H 31/001* (2013.01)

(58) Field of Classification Search
CPC ........ B62K 23/02; B62K 23/06; B62M 25/02; B62M 25/04; B62M 25/045; Y10T 74/20438
See application file for complete search history.

(56) References Cited

U.S. PATENT DOCUMENTS

| | | | | |
|---|---|---|---|---|
| 7,437,969 B2* | 10/2008 | Ose | ........................ | B62M 25/04 74/501.6 |
| 7,526,979 B2 | 5/2009 | Tsumiyama | | |
| 7,628,095 B2 | 12/2009 | Funai | | |
| 7,665,382 B2* | 2/2010 | Kawakami | ............. | B62K 23/06 74/473.14 |
| 2007/0017316 A1* | 1/2007 | Tsumiyama | ........... | B62K 23/06 74/502.2 |
| 2007/0068312 A1* | 3/2007 | Sato | ........................ | B62K 23/06 74/502.2 |
| 2008/0257098 A1* | 10/2008 | Kawakami | ............. | B62K 23/06 74/502.2 |
| 2008/0264197 A1* | 10/2008 | Shahana | ................... | B62M 9/12 74/502.2 |
| 2012/0297918 A1 | 11/2012 | Miki et al. | | |
| 2013/0081507 A1* | 4/2013 | Fukao | ..................... | B62M 25/04 74/502.2 |
| 2015/0210342 A1 | 7/2015 | Fukao et al. | | |
| 2016/0297501 A1* | 10/2016 | Fukao | ..................... | B62M 25/04 |

(Continued)

*Primary Examiner* — David H Bollinger
(74) *Attorney, Agent, or Firm* — Global IP Counselors, LLP

(57) ABSTRACT

A bicycle operating device includes a base member, a positioning ratchet, a positioning member, a release member and a release pawl. The positioning ratchet pivots about a pivot axis in first and second directions. The positioning member moves between a holding position that prevents pivoting of the positioning ratchet in the first direction, and a releasing position that releases the positioning ratchet to pivot in the first direction. The release member moves the positioning member from the holding position to the releasing position as the release member moves with respect to the base member. The release pawl is movably mounted with respect to the base member to move the release member. The release pawl includes first and second pawl parts that selectively contact the release member as the release pawl moves with respect to the base member. The first and second pawl parts are different from each other.

19 Claims, 19 Drawing Sheets

(56) References Cited

U.S. PATENT DOCUMENTS

2018/0043962 A1* 2/2018 Ng .................... B62K 23/06
2018/0072382 A1* 3/2018 Kawakami ............ B62M 25/04
2018/0251193 A1* 9/2018 Fukao ................. B62M 25/04

* cited by examiner

BICYCLE OPERATING DEVICE

BACKGROUND

Field of the Invention

This invention generally relates to a bicycle operating device. More specifically, the present invention relates to a bicycle operating device for operating a bicycle component between at least two positions.

Background Information

Bicycles are often provided with one or more bicycle components that can be operated and/or adjusted by a rider while riding. Examples of some these bicycle components include a gear changing device (e.g., a derailleur or an internally geared hub), a suspension and a seatpost. A bicycle operating device is usually provided on a bicycle in a convenient place (e.g., on a bicycle handlebar) for a rider to operate and/or adjust these bicycle components. The bicycle operating device is often connected to the bicycle component with, for example, a Bowden-type control cable. Some bicycle components are moved between two or more positions. For example, a gearshift operating device (bicycle shifter) is one example of a bicycle component operating device that is provided with a positioning unit for establishing speed stages for a gear changing device.

SUMMARY

Generally, the present disclosure is directed to various features of a bicycle operating device.

In view of the state of the known technology and in accordance with a first aspect of the present disclosure, a bicycle operating device is basically provided that comprises a base member, a positioning ratchet, a positioning member, a release member and a release pawl. The positioning ratchet is pivotally mounted with respect to the base member about a pivot axis. The positioning ratchet is configured to pivot in a first direction and a second direction that is opposite to the first direction. The positioning member is movably mounted with respect to the base member between a holding position and a releasing position. The positioning member prevents pivoting of the positioning ratchet in the first direction about the pivot axis while the positioning member is in the holding position. The positioning member releases the positioning ratchet to pivot in the first direction while the positioning member is in the releasing position. The release member is movably mounted with respect to the base member. The release member moves the positioning member from the holding position to the releasing position as the release member moves with respect to the base member. The release pawl is movably mounted with respect to the base member. The release pawl is configured to move the release member. The release pawl includes a first pawl part and a second pawl part. The first and second pawl parts are configured to selectively contact with the release member as the release pawl moves with respect to the base member. The first pawl part and the second pawl part are different from each other.

Advantageously according to the first aspect of the present invention, the bicycle operating device can quickly perform at least two releasing operations.

In accordance with a second aspect of the present invention, the bicycle operating device according to the first aspect is configured so that the positioning member includes a first positioning pawl and a second positioning pawl. The first positioning pawl is movably mounted with respect to the base member between a first holding position and a first releasing position. The first positioning pawl prevents pivoting of the positioning ratchet in the first direction about the pivot axis while the first positioning pawl is in the first holding position. The first positioning pawl releases the positioning ratchet to pivot in the first direction while the first positioning pawl is in the first releasing position. The second positioning pawl is movably mounted with respect to the base member between a second holding position and a second releasing position. The second positioning pawl prevents pivoting of the positioning ratchet in the first direction about the pivot axis while the second positioning pawl is in the second holding position. The second positioning pawl releases the positioning ratchet to pivot in the first direction while the second positioning pawl is in the second releasing position.

Advantageously according to the second aspect of the present invention, the releasing operation can be effectively carried out.

In accordance with a third aspect of the present invention, the bicycle operating device according to the first aspect is configured so that the second pawl part is circumferentially spaced from the first pawl part with respect to the pivot axis.

Advantageously according to the third aspect of the present invention, the releasing operation can be effectively carried out.

In accordance with a fourth aspect of the present invention, the bicycle operating device according to the second or third aspect is configured so that the release member moves the first positioning pawl from the first holding position to the first releasing position while the first pawl part contacts the release member and the release pawl moves the release member from a non-release position to a release position.

Advantageously according to the fourth aspect of the present invention, the releasing operation can be more effectively carried out.

In accordance with a fifth aspect of the present invention, the bicycle operating device according to the fourth aspect is configured so that the release member moves the second positioning pawl from the second holding position to the second releasing position while the second pawl part contacts the release member and the release pawl moves the release member from a non-release position to a release position.

Advantageously according to the fifth aspect of the present invention, the releasing operation can be more effectively carried out.

In accordance with a sixth aspect of the present invention, the bicycle operating device according to any one of the first to fifth aspects is configured so that the release member includes a plurality of release teeth, one of the release teeth being configured to contact with the first pawl part of the release pawl and the second pawl part of the release pawl.

Advantageously according to the sixth aspect of the present invention, the releasing operation can be effectively carried out.

In accordance with a seventh aspect of the present invention, the bicycle operating device according to any one of the second to sixth aspects is configured so that the release member includes a plurality of release teeth. One of the release teeth is configured to contact with the first pawl part of the release pawl and the second pawl part of the release pawl. The one of the release teeth being configured to contact with the first positioning pawl and the second positioning pawl.

Advantageously according to the seventh aspect of the present invention, the releasing operation can be effectively carried out.

In accordance with an eighth aspect of the present invention, the bicycle operating device according to any one of the first to seventh aspects is configured so that the release pawl is pivotally mounted with respect to the base member about the pivot axis.

Advantageously according to the eighth aspect of the present invention, the bicycle operating device can efficiently perform the releasing operations.

In accordance with a ninth aspect of the present invention, the bicycle operating device according to the eighth aspect further comprises an operating part pivotally mounted with respect to the base member about the pivot axis. The release pawl is pivotally mounted with respect to the operating part about a release pivot axis.

Advantageously according to the ninth aspect of the present invention, the bicycle operating device can easily perform the releasing operations.

In accordance with a tenth aspect of the present invention, the bicycle operating device according to any one of the second to ninth aspects is configured so that the first positioning pawl and the second positioning pawl are configured to move independently of each other.

Advantageously according to the tenth aspect of the present invention, the bicycle operating device can efficiently perform the releasing operations.

In accordance with an eleventh aspect of the present invention, the bicycle operating device according to any one of the second to tenth aspects is configured so that the first positioning pawl is pivotally mounted with respect to the base member about a pawl pivot axis.

Advantageously according to the eleventh aspect of the present invention, the bicycle operating device can be relatively compact.

In accordance with a twelfth aspect of the present invention, the bicycle operating device according to the eleventh aspect is configured so that the second positioning pawl is pivotally mounted with respect to the base member about the pawl pivot axis.

Advantageously according to the twelfth aspect of the present invention, the bicycle operating device can be relatively compact.

In accordance with a thirteenth aspect of the present invention, the bicycle operating device according to any one of the second to twelfth aspects further comprises at least one biasing member biasing the first positioning pawl toward the first holding position, and biasing the second positioning pawl toward the second holding position.

Advantageously according to the thirteenth aspect of the present invention, the bicycle operating device can efficiently perform the releasing operations.

In accordance with a fourteenth aspect of the present invention, the bicycle operating device according to the thirteenth aspect is configured so that the at least one biasing member includes a first biasing member biasing the first positioning pawl toward the first holding position, and a second biasing member biasing the second positioning pawl toward the second holding position.

Advantageously according to the fourteenth aspect of the present invention, the first and second positioning pawls can be independently biased toward the first and second holding positions.

In accordance with a fifteenth aspect of the present invention, the bicycle operating device according to any one of the second to fourteenth aspects is configured so that the positioning ratchet includes a plurality of positioning abutments circumferentially arranged with respect to the pivot axis. The first and second positioning pawls alternately contact the positioning abutments to prevent pivoting of the positioning ratchet in the first direction about the pivot axis.

Advantageously according to the fifteenth aspect of the present invention, the bicycle operating device can establish a plurality of predetermined positions.

In accordance with a sixteenth aspect of the present invention, the bicycle operating device according to any one of the first to fifteenth aspects further comprises a wire takeup member arranged to pivot together with the positioning ratchet as the positioning ratchet pivots with respect to the base member about the pivot axis.

Advantageously according to the sixteenth aspect of the present invention, the bicycle operating device can be used to operate a cable operated bicycle component.

In accordance with a seventeenth aspect of the present invention, the bicycle operating device according to any one of the first to sixteenth aspects further comprises a first operating member operatively coupled to the positioning member to selectively move the positioning member from the holding position to the releasing position as the first operating member moves from a first rest position to a first actuated position.

Advantageously according to the seventeenth aspect of the present invention, the bicycle operating device can be easily operated to perform the releasing operations.

In accordance with an eighteenth aspect of the present invention, the bicycle operating device according to the seventeenth aspect further comprises a second operating member operatively coupled to the positioning ratchet to pivot the positioning ratchet with respect to the base member in the second direction as the second operating member moves from a second rest position to a second actuated position.

Advantageously according to the eighteenth aspect of the present invention, the bicycle operating device can be easily operated to perform a pulling operation.

In accordance with a nineteenth aspect of the present invention, the bicycle operating device according to the eighteenth aspect further comprises a pulling member and a pulling pawl. The pulling member is movably mounted with respect to the base member. The pulling member pivots the positioning ratchet in the second direction as the pulling member moves with respect to the base member. The pulling pawl is movably mounted on the second operating member. The pulling pawl contacts the pulling member and moves the pulling member as the second operating member moves from the second rest position to the second actuated position.

Advantageously according to the nineteenth aspect of the present invention, the pulling operation can be effectively carried out.

Also, other objects, features, aspects and advantages of the disclosed bicycle operating device will become apparent to those skilled in the art from the following detailed description, which, taken in conjunction with the annexed drawings, discloses one main embodiment of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
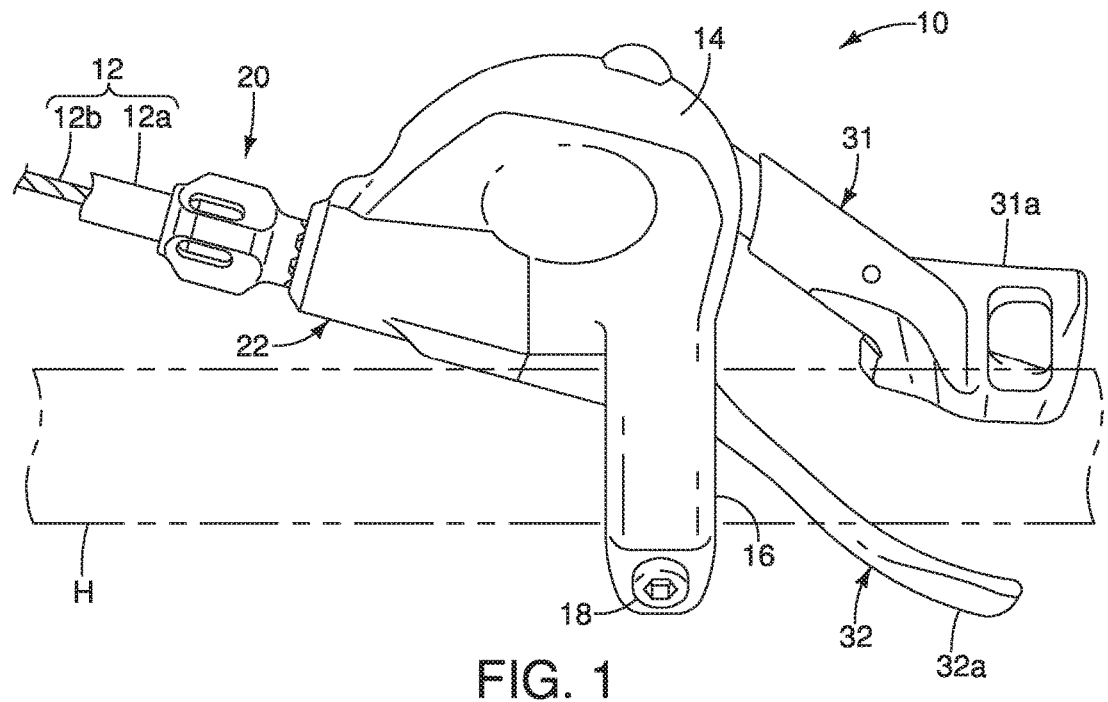
FIG. 1 is a top plan view of a portion of a handlebar with a bicycle operating device in accordance with one illustrated embodiment.

Referring initially to FIG. 1, a bicycle operating device 10 is illustrated in accordance with one illustrated embodiment. Here, the bicycle operating device 10 is configured to be mounted to a right side of a handlebar H so as to be operated by rider's right hand. In the illustrated embodiment, the bicycle operating device 10 is configured to be operatively coupled to a bicycle component (not shown) via a control cable 12. More specifically, the bicycle operating device 10 is configured as a shifter for controlling the gear positions of a rear gear changing device such as a derailleur or an internally geared hub. However, the bicycle operating device 10 can be configured as a bicycle control device for operating other types of bicycle components (e.g., suspension devices, seatposts, etc.) as needed and/or desired.

Also, the bicycle operating device 10 can be modified to be mounted on the left side of a handlebar H. Thus, two bicycle operating devices could be provided on opposite ends of the handlebar H. In such a case, one of the bicycle operating devices would be used to operate a first bicycle component and the other of the bicycle operating devices would be used to operate a second bicycle component. When the bicycle operating devices are configured as gear shifters, the two bicycle operating devices could be essentially identical in operation, except that they would be mirror images of each other, and they may have a different number of actuation (shift) positions.

Preferably, as seen in FIG. 1, the control cable 12 is a conventional bicycle operating cable that has an outer case 12a covering an inner wire 12b. In other words, the control cable 12 is a Bowden type cable in which the inner wire 12b is slidably received within the outer case 12a. The bicycle operating device 10 operates the bicycle component (not shown) by selectively pulling and releasing the inner wire 12b.

As seen in FIG. 1, the bicycle operating device 10 includes a housing 14 and a handlebar clamp 16. The housing 14 encloses a cable position maintaining mechanism of the bicycle operating device 10 that holds the inner wire 12b at various predetermined positions as discussed below. The housing 14 also encloses a cable releasing mechanism and a cable pulling mechanism of the bicycle operating device 10 that releases and pulls the inner wire 12b, respectively, between the various predetermined positions as discussed below. Here, for example, the housing 14 has a two-piece construction having a pair of housing parts that are fastened together by a plurality of screws. The housing parts are hard rigid members constructed of a suitable material such as a hard plastic or a lightweight metal. However, the housing 14 can have a variety of configurations as needed and/or desired. As seen in FIG. 1, the handlebar clamp 16 is integrally formed with one of the housing parts. Alternatively, the handlebar clamp 16 can be a separate part that is fastened to the housing 14 (e.g., by a threaded fastener). The handlebar clamp 16 is a conventional tube clamp that constitutes an example of a handlebar mounting member. Here, the handlebar clamp 16 includes a tightening bolt 18 or other tightening members that are configured to squeeze the handlebar clamp 16 onto the handlebar H. Preferably, the bicycle operating device 10 includes a cable adjuster 20 for adjusting the inner wire 12b in a conventional manner.

Figure 2:
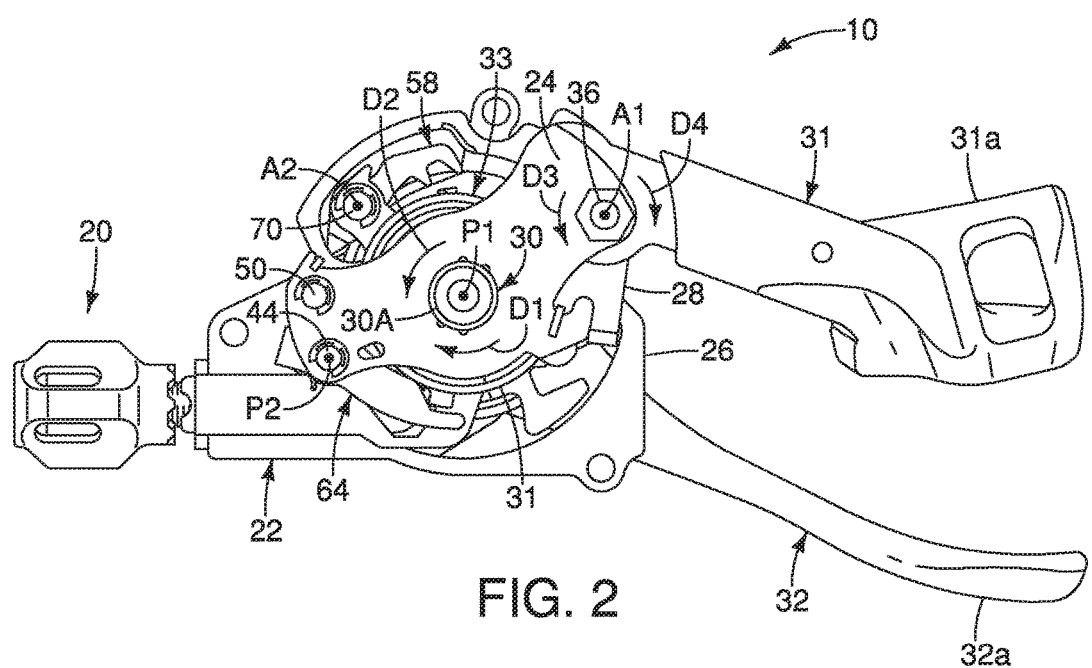
FIG. 2 is a top plan view of the bicycle operating device illustrated in FIG. 1 with the housing remove to reveal the internal parts and with the first and second operating members being disposed in first and second rest positions, respectively.
Figure 3:
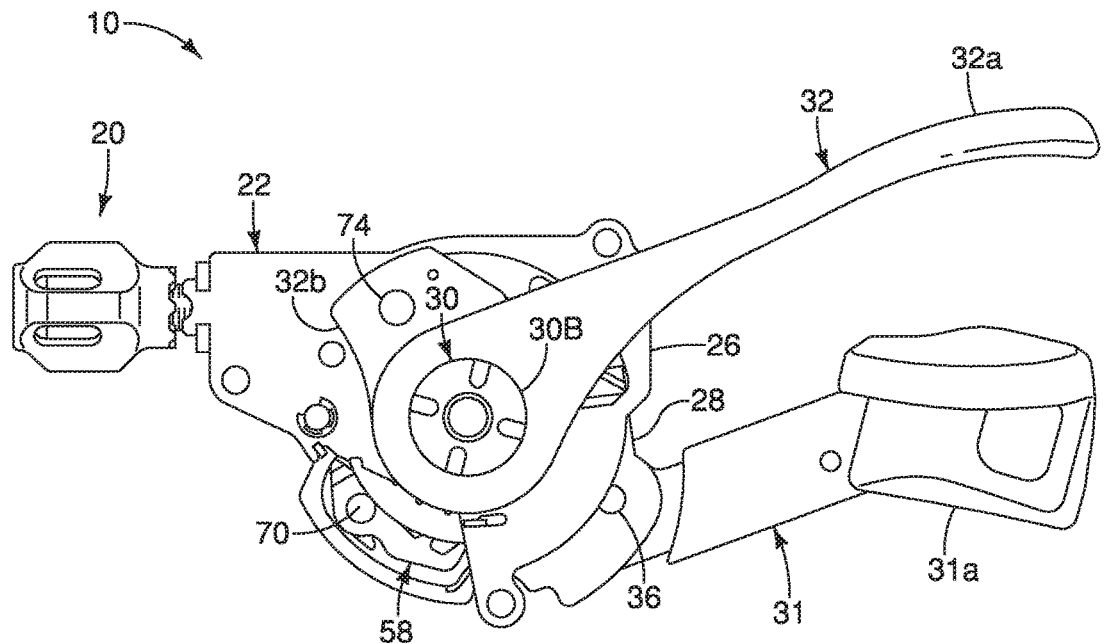
FIG. 3 is a bottom plan view of the bicycle operating device illustrated in FIG. 1 with the housing remove to reveal the internal parts and with the first and second operating members being disposed in the first and second rest positions, respectively.
Figure 4:
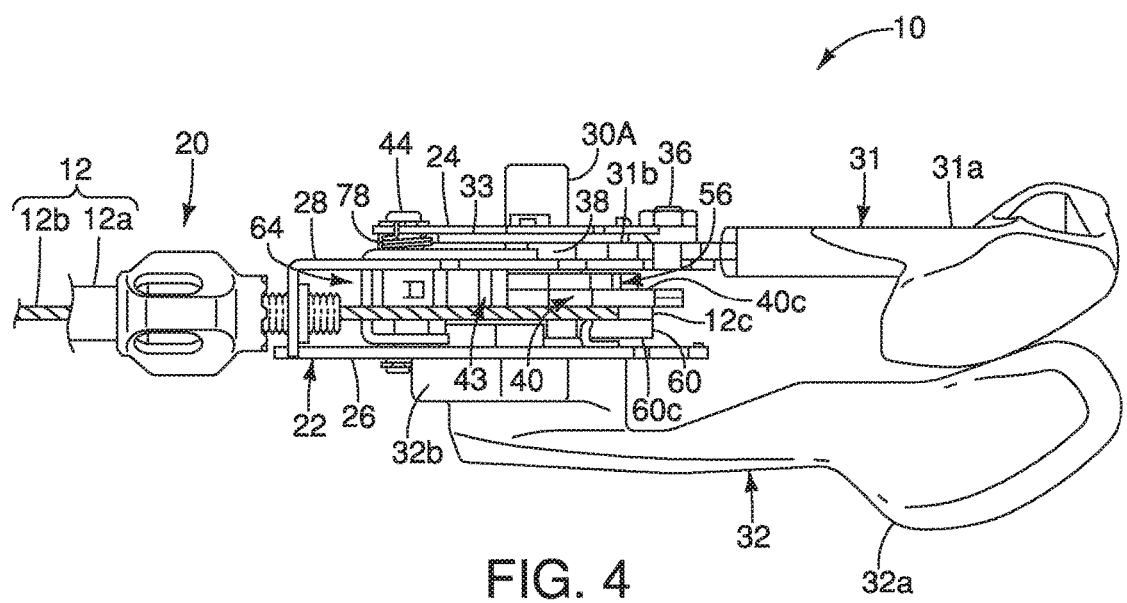
FIG. 4 is a side elevational view of the bicycle operating device illustrated in FIG. 1 with the housing remove to reveal the internal parts and with the first and second operating members being disposed in the first and second rest positions, respectively.

As seen in FIGS. 2 to 4, the bicycle operating device 10 further comprises a base member 22. The base member 22 is considered to include the housing 14, the handlebar clamp 16, and an internal support structure that basically supports various internal parts of the cable position maintaining mechanism, the cable releasing mechanism and the cable pulling mechanism. This internal support stricture includes a first or top stationary support plate 24, a second or bottom stationary support plate 26, a third or middle stationary support plate 28 and a support shaft 30. The stationary support plates 24, 26 and 28 are rigid plates that are made of a suitable material such as, for example, a metallic material. Here, the support shaft 30 includes a bolt 30A and a nut 30B (FIG. 3). The bolt 30A of the support shaft 30 has a longitudinal axis that defines a first pivot axis (pivot axis) P1. The base member 22 is fixedly coupled to a bicycle part (e.g., the handlebar H in the illustrated embodiment).

As seen in FIGS. 1 to 4, the bicycle operating device 10 further comprises a first operating member 31. The first operating member 31 is used to release the inner wire 12b from the housing 14. The first operating member 31 is movably mounted with respect to the base member 22 between a first rest position (FIGS. 1, 2, 15, and 16) and a first actuated position (FIGS. 17 to 24 and 26 to 29). As explained below, the first operating member 31 has at least two of the first actuated positions. Also the bicycle operating device 10 further comprises a second operating member 32. The second operating member 32 is used to pull the inner wire 12b into the housing 14. The second operating member 32 is configured to move with respect to the base member 22 from a second rest position (FIGS. 1, 2, 31 and 33) to a second actuated position (FIG. 32). The first and second operating members 31 and 32 release and pull the inner wire 12b with respect to the housing 14 in response to operation of the first and second operating members 31 and 32 as discussed below.

Figure 8:
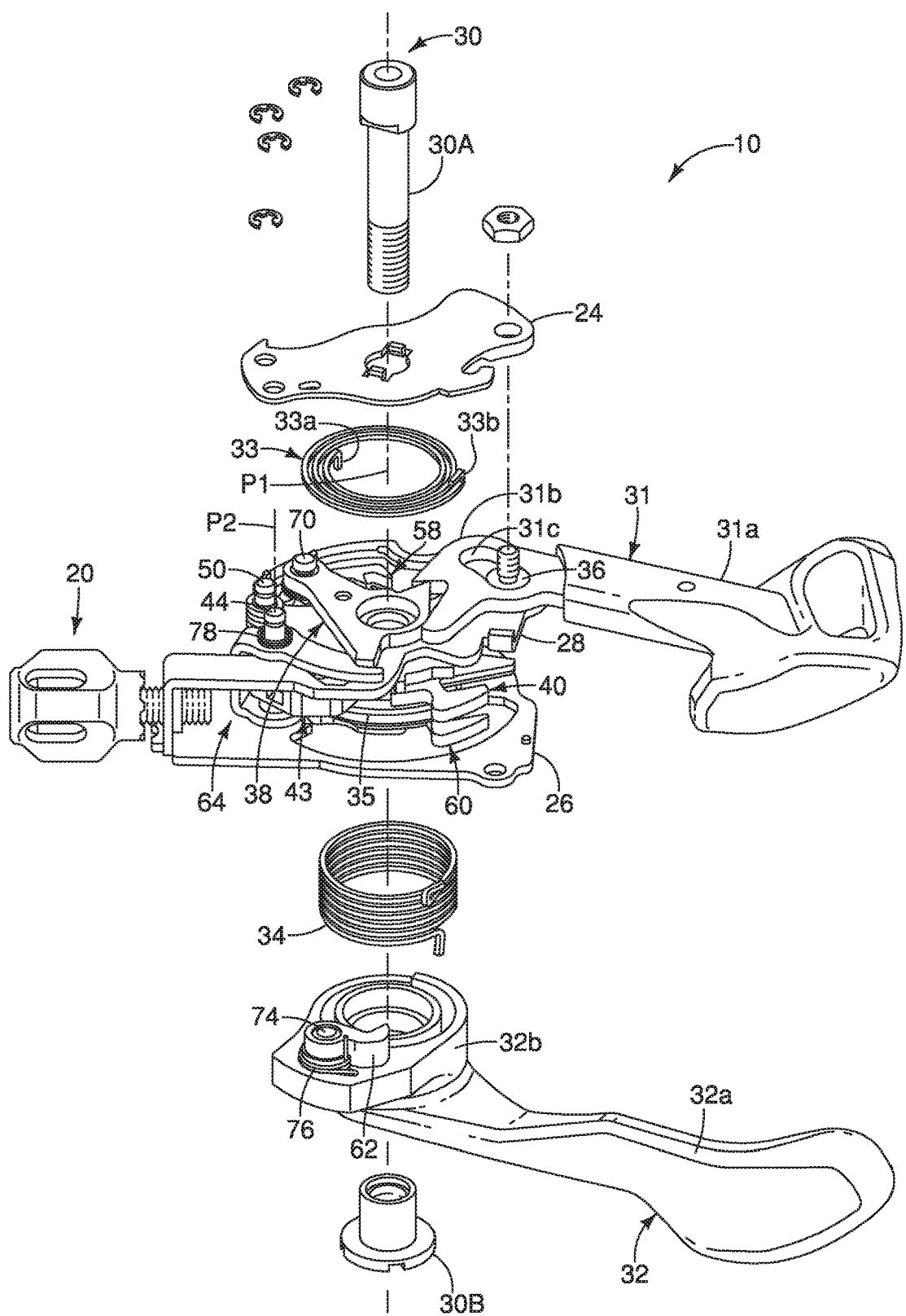
FIG. 8 is a partially exploded perspective view of selected internal parts of the bicycle operating device illustrated in FIG. 1.

As seen in FIG. 1, the first operating member 31 includes a user operating part 31a that is completely located outside of the housing 14 for the user or rider to pivot the first operating member 31 with respect to the housing 14. As seen in FIGS. 4 and 8, the first operating member 31 further includes a mounting part 31b that is configured to be located inside of the housing 14 and movably mounted to the internal support structure (e.g., the top stationary support plate 24 and the middle stationary support plate 28 as in the illustrated embodiment). The second operating member 32 includes a user operating part 32a that is completely located outside of the housing 14 for the user or rider to pivot the second operating member 32 with respect to the housing 14. As seen in FIGS. 4 and 8, the second operating member 32 further includes a mounting part 32b that is located inside of the housing 14 and movably mounted to the internal support structure (e.g., the support shaft 30 as in the illustrated embodiment).

The first and second operating members 31 and 32 are configured as trigger levers that are biased towards the first and second rest positions, respectively, as shown in FIGS. 1 to 4 and 8. In particular, as seen in FIG. 8, a first biasing element 33 is operatively provided between the first operating member 31 and the top stationary support plate 24 so that the first operating member 31 is return to the first rest position after being operated and released by the user. Similarly, a second biasing element 34 is operatively provided between the second operating member 32 and the bottom stationary support plate 26 so that the second operating member 32 is return to the second rest position after being operated and released by the user. Thus, as trigger levers, the first and second operating members 31 and 32 automatically return to their rest or home positions after being operated and then released by the user.

In the case of the bicycle operating device 10 being used as a shifting device, the first and second operating members 31 and 32 constitutes shift levers. The first operating member 31 constitutes a release lever for releasing the inner wire 12.b from the housing 14 as the first operating member 31 is moved by the user from the first rest position (FIGS. 1, 2, 15, and 16) to a first actuated position (FIGS. 17 to 24 and 26 to 29). On the other hand, the second operating member 32 constitutes a pulling lever for pulling the inner wire 12b into the housing 14 as the second operating member 32 is moved by the user from the second rest position to a second actuated position. The first and second operating members 31 and 32 also constitute user operating levers of the bicycle operating device 10.

As explained later, the first operating member 31 can be operated from the first rest position to one of the first actuated positions by pivoting the first operating member 31 in a first direction D1 about the first pivot axis P1, while the second operating member 32 can be operated from the second rest position to the second actuated position by pivoting the second operating member 32 in a second direction D2 about the first pivot axis P1. The second direction D2 is opposite to the first direction D1. As explained later, the first operating member 31 can also be operated from the first rest position to another one of the first actuated positions by pivoting the first operating member 31 in a third direction D3 about an operating axis A1.

Figure 10:
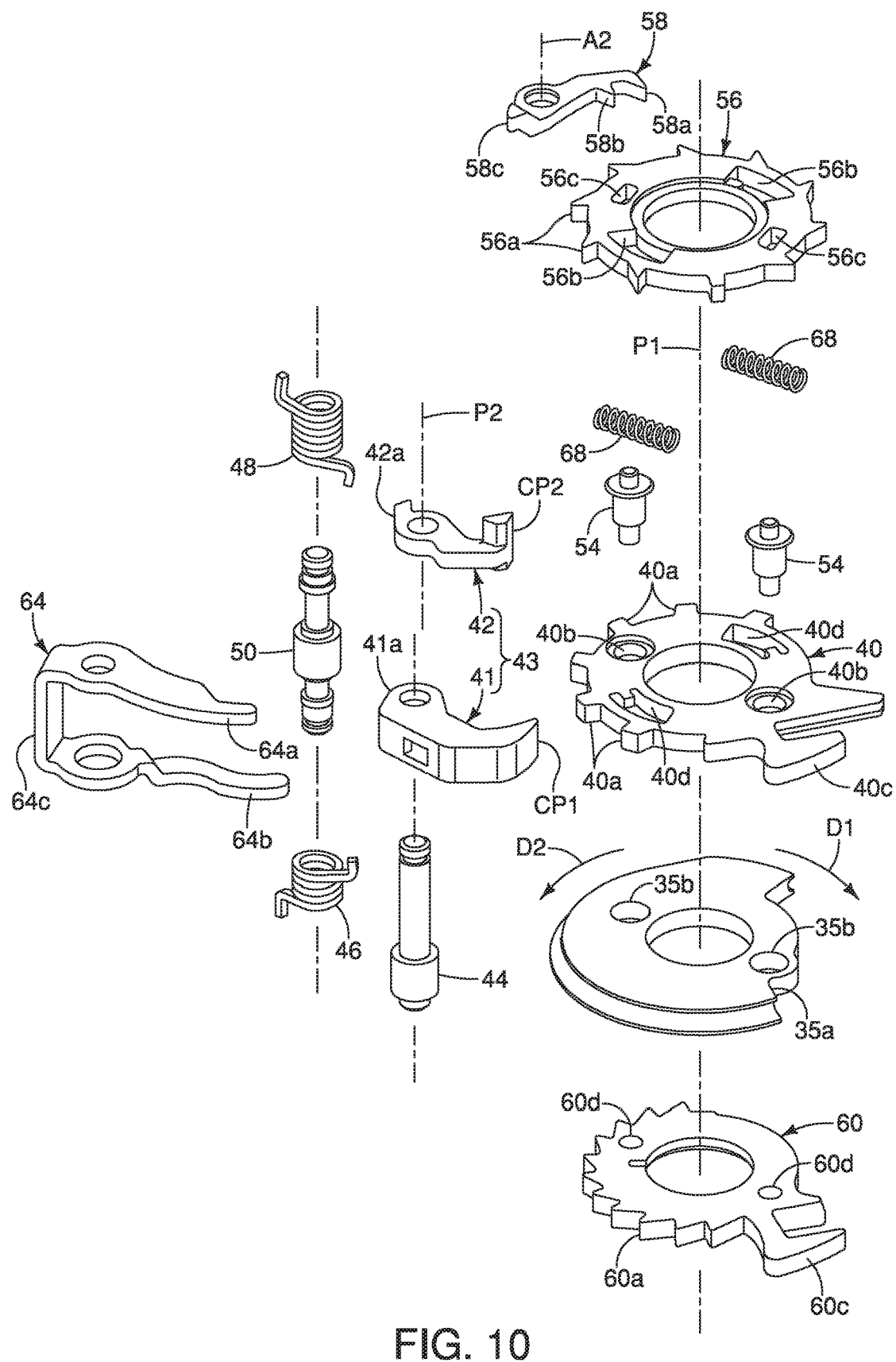
FIG. 10 is a partially exploded perspective view of selected internal parts of the bicycle operating device illustrated in FIG. 1.

In the illustrated embodiment, the bicycle operating device 10 is particularly useful for operating a cable operated bicycle component. Thus, in the illustrated embodiment, the bicycle operating device 10 further comprises a wire takeup member 35. Referring to FIGS. 4, 8 and 10 the wire takeup member 35 has a cable nipple abutment 35a for contacting a cable nipple 12c of the inner wire 12b such that the inner wire 12b moves as the wire takeup member 35 moves. The wire takeup member 35 is pivotally mounted on the support shaft 30 to release or pull the inner wire 12b depending on the pivotal direction of the wire takeup member 35. As explained below, the wire takeup member 35 is biased in the first direction D1. Here, the wire takeup member 35 releases the inner wire 12b from the housing 14 as the wire takeup member 35 pivots in the first direction D1 in response to operation of the first operating member 31. Thus, in the illustrated embodiment, the first direction D1 is a wire releasing direction of the wire takeup member 35. On the other hand, the wire takeup member 35 pulls the inner wire 12b into the housing 14 as the wire takeup member 35 pivots in the second direction D2 in response to operation of the second operating member 32. Thus, in the illustrated embodiment, the second direction D2 is a wire pulling direction of the wire takeup member 35. In the illustrated embodiment, the wire takeup member 35 is a spool that is rotatably mounted on the support shaft 30. The wire takeup member 35 is a rigid part that is made of a suitable material such as, for example, a hard non-metallic material.

Figure 9:
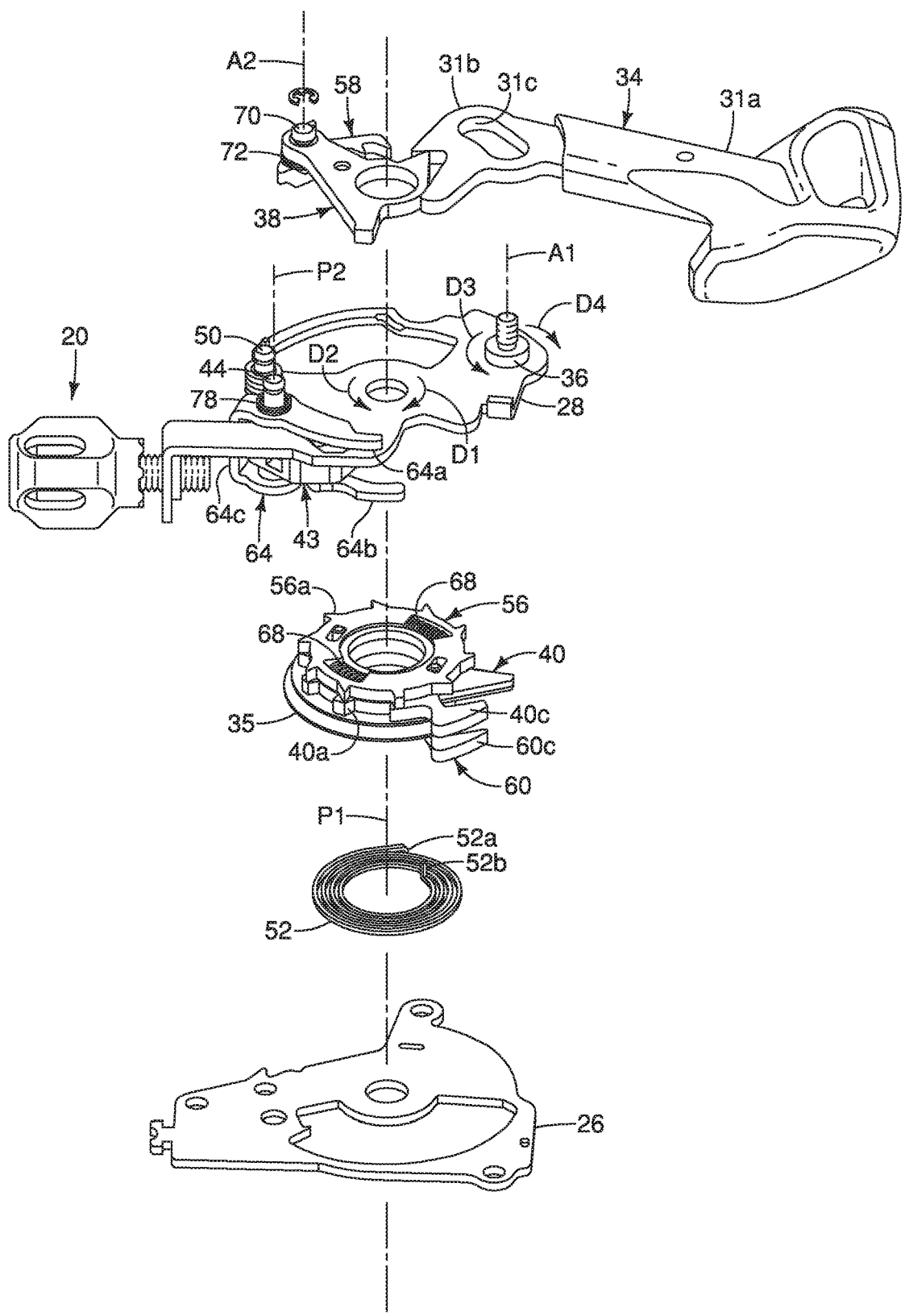
FIG. 9 is a partially exploded perspective view of selected internal parts of the bicycle operating device illustrated in FIG. 1.

Referring to FIGS. 4 and 8, the first operating member 31 is movably attached to the top and middle stationary support plates 24 and 28 by a pivot pin 36. The pivot pin 36 is disposed in an arc shaped slot 31c having a center of curvature located at or substantially at the first pivot axis P1. The pivot pin 36 defines the operating axis A1. Here, as seen in FIGS. 8 and 9, the bicycle operating device 10 further comprises an internal operating part 38 that is pivotally mounted with respect to the base member 22 about the first pivot axis P1. The first operating member 31 cooperates with the internal operating part 38 such that the first operating member 31 can be operated by the rider either in the first direction D1 about the first pivot axis P1 or in the third direction D3 about the operating axis A1. Basically, operation of the first operating member 31 pivots the internal operating part 38 in the first direction D1 about the first pivot axis P1. Thus, the internal operating part 38 is movably mounted with respect to the base member 22 between a rest position and an actuated position. The internal operating part 38 can further be considered a first operating member that can be integrally formed with the first operating member 31.

As the first operating member 31 is operated in the first direction D1, the first operating member 31 and the internal operating part 38 pivot together about the first pivot axis P1 as an integrated unit so that there is practically no relative movement between the first operating member 31 and the internal operating part 38. On the other hand, as the first operating member 31 is operated in the third direction D3, the first operating member 31 pivots about the operating axis A1 and the internal operating part 38 pivots about the first pivot axis P1 in the first direction D1. The bi-directional releasing operation of the first operating member 31 and the internal operating part 38 is basically the same as the bi-directional releasing operation that is disclosed in more detail in U.S. Patent Application Publication No. 2015/0210342, which is assigned to Shimano, Inc.

Of course, alternatively, the first operating member 31 can be configured such that the first operating member 31 can be pivoted in only one direction to perform a releasing operation. In other words, the internal operating part 38 and the first operating member 31 can be formed as a single piece if it is desirable for the first operating member 31 to be operated only in a single direction.

In both cases, the first biasing element 33 functions as a return spring for returning the first operating member 31 and the internal operating part 38 from their actuated positions back to their rest positions, respectively. As a result, the first operating member 31 is a trigger member that returns to its rest position upon being, operated and released. In particular, the first biasing element 33 is a flat coil torsion spring that is coiled about the bolt 30A of the support shaft 30. A first end part 33a of the first biasing element 33 is attached to the internal operating part 38 (i.e., disposed in an opening of the internal operating part 38). A second end part 33b of the first biasing element 33 is attached to the base member 22 (i.e., hooked onto the top stationary support plate 24). The first biasing element 33 biases the internal operating part 38 in the second direction D2, which in turn biases the first operating member 31 in the second direction D2 against the pivot pin 36. The first operating member 31 has a pair of projections that contact the internal operating part 38 to maintain the first operating member 31 in the rest position. In other words, the first operating member 31 is effectively biased in a fourth direction D4 about the operating axis A1. In this way, the first operating member 31 and the internal operating part 38 are stationary and held from freely moving while the first operating member 31 is urged to the first rest position by the biasing force of the first biasing element 33.

Referring to FIGS. 5 to 10, the position maintaining mechanism will now be discussed. The position maintaining mechanism is used for holding the inner wire 12b while the first and second operating members 31 and 32 are in their rest positions. In particular, in the illustrated embodiment, the bicycle operating device 10 further comprises a positioning ratchet 40, a first positioning pawl 41 and a second positioning pawl 42. Thus, the positioning ratchet 40, the first positioning pawl 41 and the second positioning pawl 42 are the primary parts used in the position maintaining mechanism of the bicycle operating device 10 of the illustrated embodiment.

As best seen in FIGS. 9 and 10, the positioning ratchet 40 is basically a rigid plate that is made of a suitable material such as, for example, a metallic material. The positioning ratchet 40 includes a plurality of positioning abutments 40a that are circumferentially arranged with respect to the first pivot axis P1. The first and second positioning pawls 41 and 42 alternately contact the positioning abutments 40a to prevent pivoting of the positioning ratchet 40 in the first direction D1 about the first pivot axis P1. As explained below, the positioning ratchet 40 is fixed to the wire takeup member 35 so that the wire takeup member 35 and the positioning ratchet 40 pivot together as a unit about the first pivot axis P1. Basically, the positioning ratchet 40 is pivotally mounted with respect to the base member 22 about the first pivot axis P1. Specifically, the positioning ratchet 40 is configured to pivot in the first direction D1 and the second direction D2. More specifically, the positioning ratchet 40 is pivotally mounted on the bolt 30A of the support shaft 30.

The first operating member 31 is operatively coupled to the positioning ratchet 40 to pivot the positioning ratchet 40 with respect to the base member 22 in the first direction D1 as the first operating member 31 moves from the first rest position to one of the first actuated positions. On the other hand, the second operating member 32 is operatively coupled to the positioning ratchet 40 to pivot the positioning ratchet 40 with respect to the base member 22 in the second direction D2 as the second operating member 32 moves from the second rest position to the second actuated position.

Generally, the bicycle operating device 10 comprises a positioning member 43. In the illustrated embodiment, the positioning member 43 includes the first positioning pawl 41 and the second positioning pawl 42. However, the positioning member 43 can be a single positioning pawl if needed and/or desired. Here, the positioning member 43 is movably mounted with respect to the base member 22 between a holding position and a releasing position. Specifically, the positioning member 43 is pivotally mounted with respect to the base member 22 about a second pivot axis P2 between a holding position and a releasing position. More specifically, the internal operating part 38 is operatively coupled to the positioning member 43 to selectively move the positioning member 43 from the holding position to the releasing position as the internal operating part 38 moves from the rest position to the actuated position. In the illustrated embodiment, the first operating member 31 pivots the internal operating part 38 to selectively move the positioning member 43 from the holding position to the releasing position as the internal operating part 38 moves from the rest position to the actuated position. Basically, the positioning member 43 prevents pivoting of the positioning ratchet 40 in the first direction D1 about the first pivot axis P1 while the positioning member 43 is in the holding position. The positioning member 43 releases the positioning ratchet 40 to pivot in the first direction D1 while the positioning member 43 is in the releasing position.

Here, in the illustrated embodiment, the first positioning pawl 41 is movably mounted with respect to the base member 22 between a first holding position and a first releasing position. Similarly, the second positioning pawl 42 is movably mounted with respect to the base member 22 between a second holding position and a second releasing position. Specifically, the first positioning pawl 41 is pivotally mounted with respect to the base member 22 about a pawl pivot axis (i.e., the second pivot axis P2) between the first holding position and the first releasing position. The second positioning pawl 42 is pivotally mounted with respect to the base member 22 about the second (pawl) pivot axis P2 between the second holding position and the second releasing position. The first operating member 31 selectively moves the first and second positioning pawls 41 and 42 from the first and second holding positions to the first and second releasing positions, respectively, as the first operating member 31 moves from the first rest position to the first actuated position. In this way, the first and second positioning pawls 41 and 42 selectively hold and release the positioning ratchet 40. Basically, only one of first and second positioning pawls 41 and 42 engages one of the positioning abutments 40a at any given time. More particularly, the first and second positioning pawls 41 and 42 alternately move into engagement with one of the positioning abutments 40a of the positioning ratchet 40 as the positioning ratchet 40 moves from one of the predetermined positions to the next one of the predetermined positions.

Figure 7:
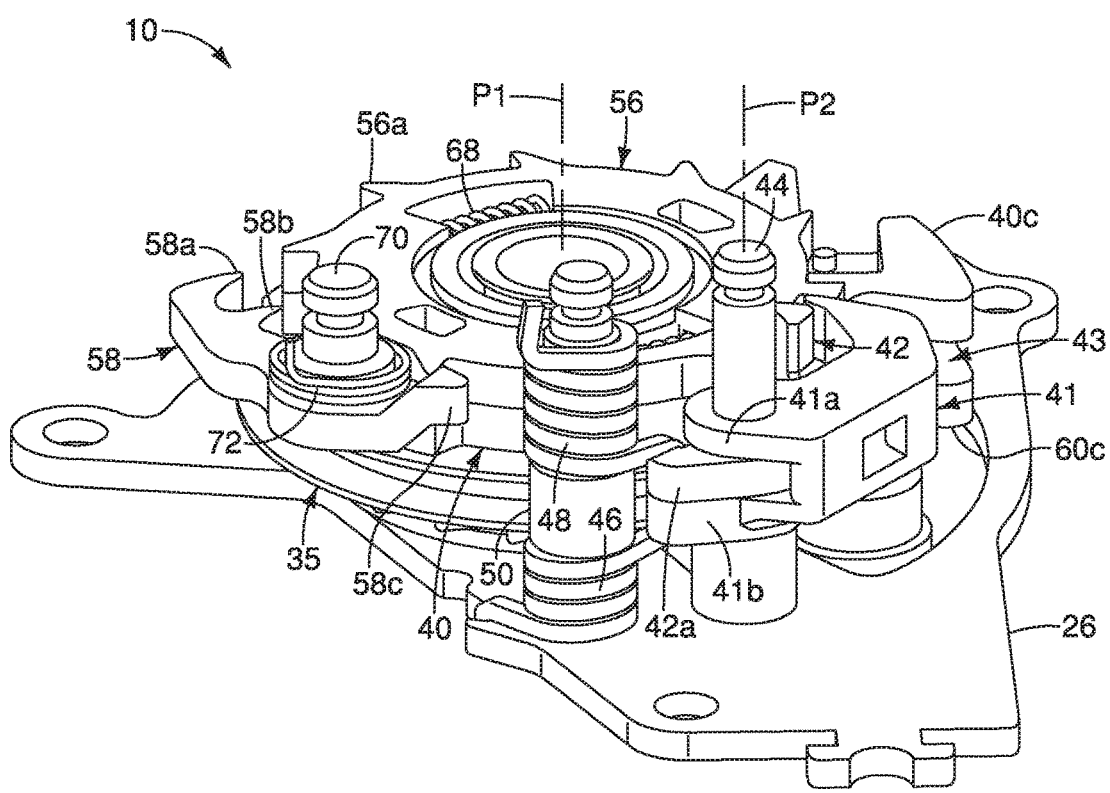
FIG. 7 is a perspective view of selected internal parts of the bicycle operating device illustrated in FIG. 1.

As best seen in FIGS. 6, 7 and 10 to 12, the first positioning pawl 41 and the second positioning pawl 42 are configured to move independently from each other. In the illustrated embodiment, the bicycle operating device 10 further comprises a pivot pin 44 that pivotally supports the first positioning pawl 41 and the second positioning pawl 42. The first positioning pawl 41 includes a first mounting portion 41a and a second mounting portion 41b. The second mounting portion 41b is spaced apart from the first mounting portion 411a in an axial direction that is parallel to the second (pawl) pivot axis P2. As best seen in FIG. 7, the second positioning pawl 42 includes a third mounting portion 42a that is disposed between the first mounting portion 41a and the second mounting portion 41b in the axial direction. Thus, the pivot pin 44 defines the second pivot axis P2, which is parallel to the first pivot axis P1 and the operating axis A1.

Still referring to FIGS. 6, 7 and 10 to 12, the bicycle operating device 10 further comprises at least one biasing member biasing the first positioning pawl 41 toward the first holding position, and biasing the second positioning pawl 42 toward the second holding position. In the illustrated embodiment, the at least one biasing member includes a first biasing member 46 and a second biasing member 48. The bicycle operating device 10 further comprises a pin 50 that supports the at least one biasing member (i.e., the first and second biasing members 46 and 48 in the illustrated embodiment). The first biasing member 46 biases the first positioning pawl 41 toward the first holding position. In other words, the first biasing member 46 biases the first positioning pawl 41 towards a peripheral edge of the positioning ratchet 40 into engagement with one of the positioning abutments 40a of the positioning ratchet 40. The second biasing member 48 biases the second positioning pawl 42 toward the second holding position. In other words, the second biasing member 48 biases the second positioning pawl 42 towards the peripheral edge of the positioning ratchet 40 into engagement with one of the positioning abutments 40a of the positioning ratchet 40.

The first biasing member 46 is different from the second biasing member 48. In particular, the first and second biasing members 46 and 48 are coil torsion springs that are coiled about the pin 50. The first biasing member 46 has one end 46a engaged with (i.e., hooked onto) the bottom stationary support plate 26 and the other end 46b engaged with (i.e., contacting) the first positioning pawl 41. On the other hand, the second biasing member 48 has one end 48a engaged with (i.e., hooked onto) the middle stationary support plate 28 and the other end 48b engaged with (i.e., contacting) the second positioning pawl 42. However, the first and second biasing members 46 and 48 can be formed a single biasing member that biases both of the first and second positioning pawls 41 and 42 towards engagement with the positioning ratchet 40.

Figure 11:
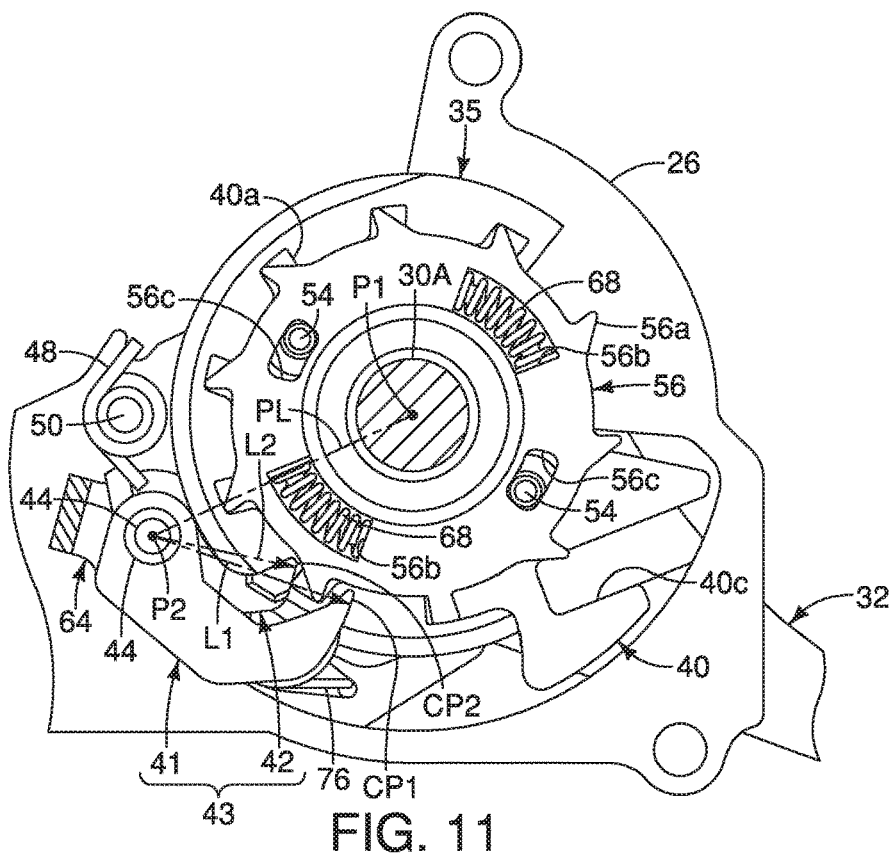
FIG. 11 is a top plan view of selected internal parts of the bicycle operating device illustrated in FIG. 1 that shows a second positioning pawl engaged with a positioning abutment of the positioning ratchet to establish one of a plurality of predetermined positions of a wire takeup member.
Figure 12:
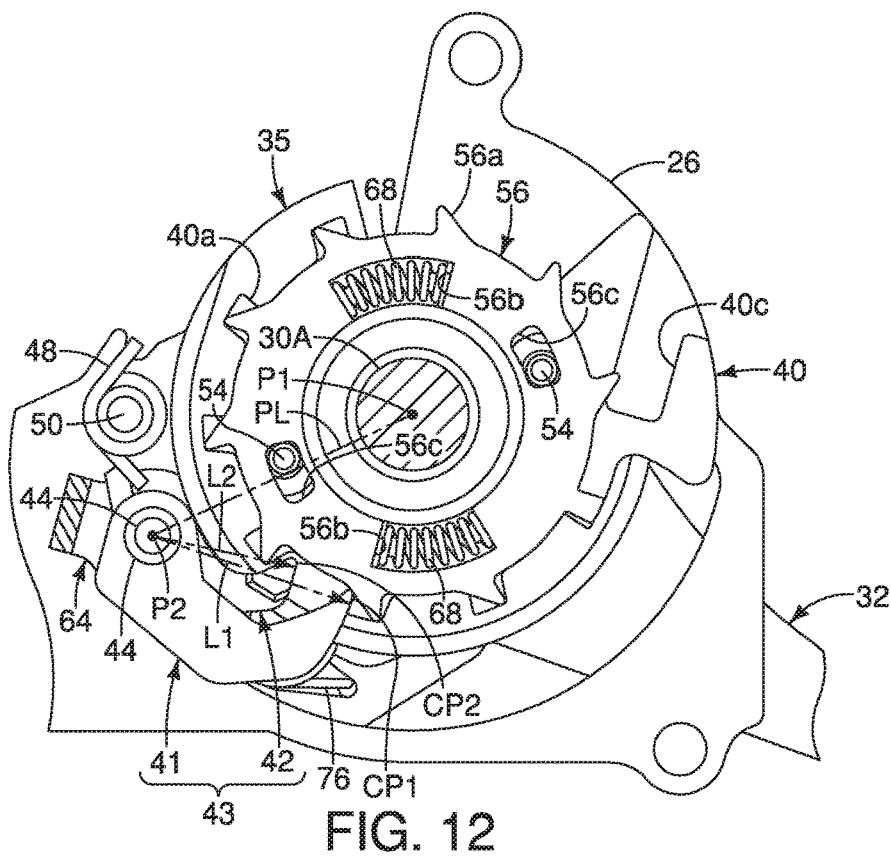
FIG. 12 is a top plan view, similar to FIG. 11, of the selected internal parts illustrated in FIG. 11, but with the positioning ratchet and the wire takeup member rotated such that a first positioning pawl is engaged with a different positioning abutment of the positioning ratchet to establish another one of the plurality of predetermined positions.
Figure 20:
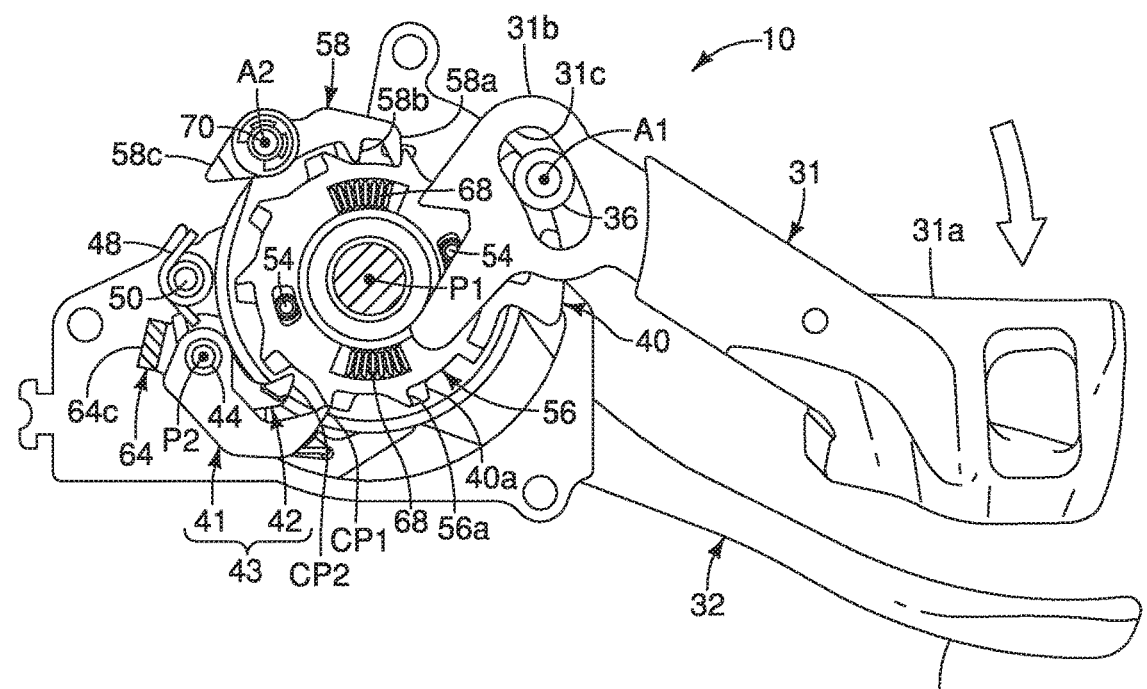
FIG. 20 is a top plan view similar to FIG. 19, of selected internal parts of the bicycle operating device illustrated in FIG. 1 but with additional parts removed.
Figure 21:
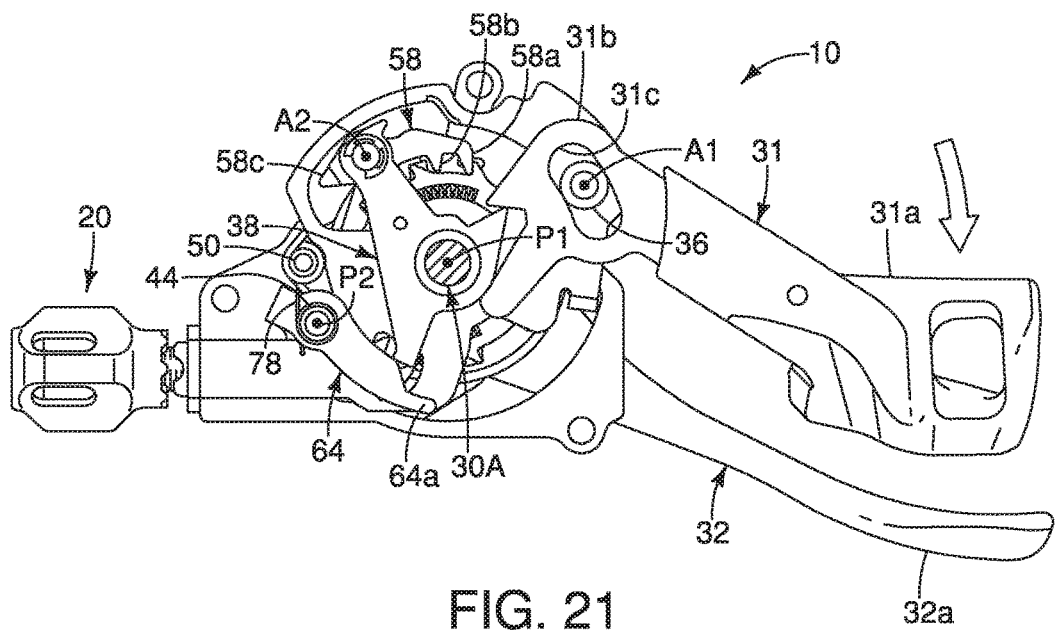
FIG. 21 is a top plan view of selected internal parts of the bicycle operating device illustrated in FIG. 1 with the first operating member moved farther in the first (operating) direction from the position shown in FIGS. 19 and 20 such that the positioning ratchet pivots relative to the first release member.
Figure 22:
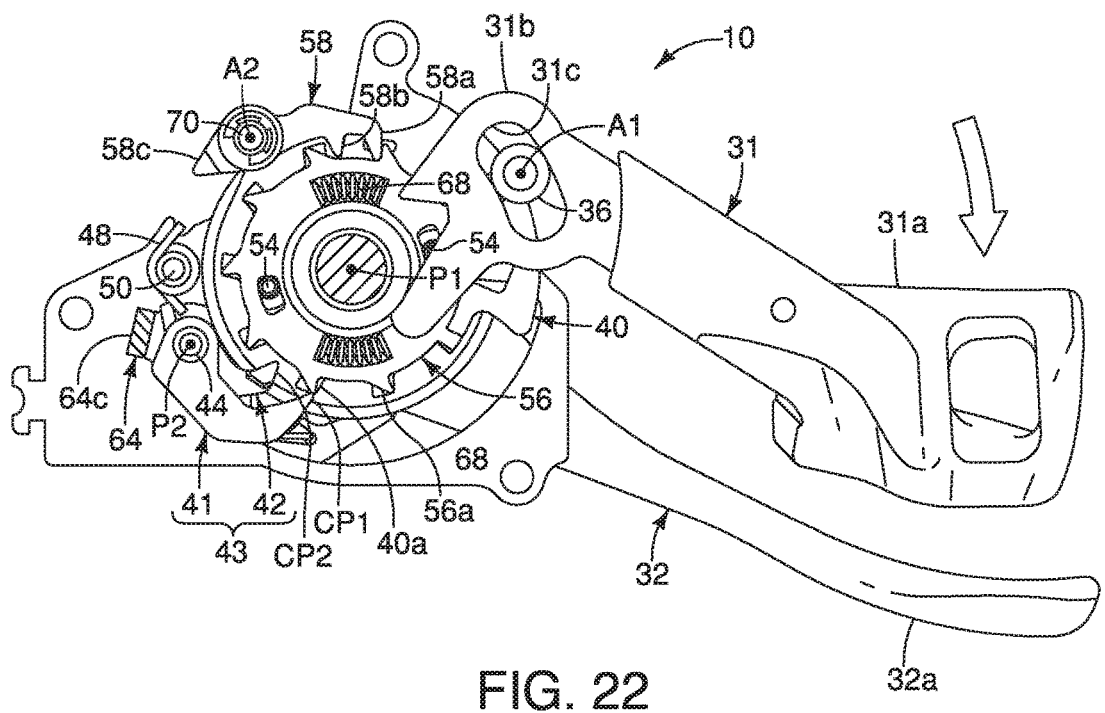
FIG. 22 is a top plan view similar to FIG. 21, of selected internal parts of the bicycle operating device illustrated in FIG. 1 but with additional parts removed.
Figure 23:
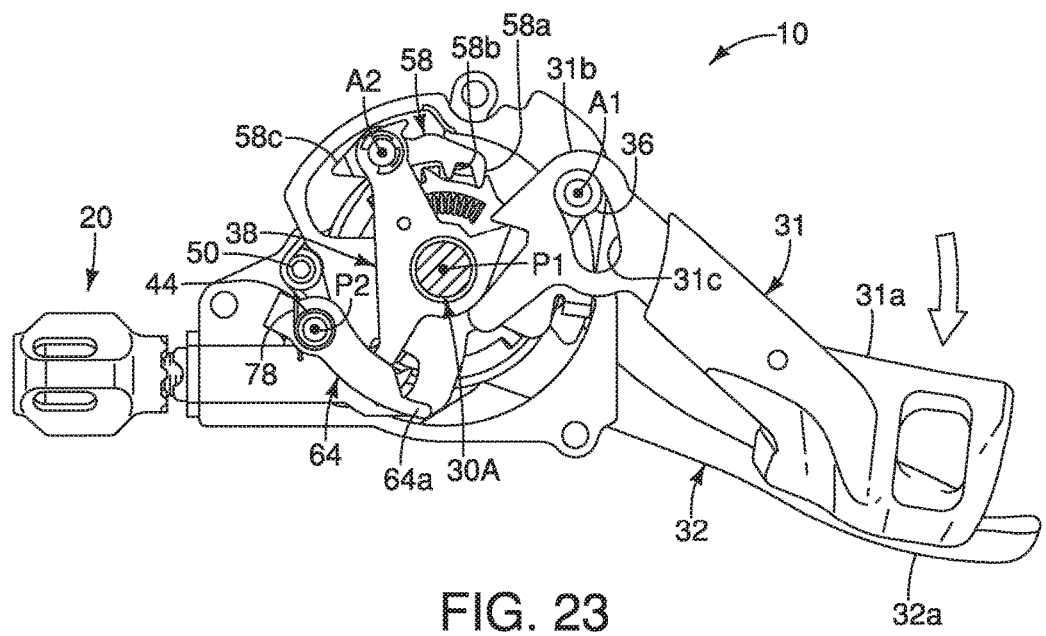
FIG. 23 is a top plan view of selected internal parts of the bicycle operating device illustrated in FIG. 1 with the first operating member moved farther in the first (operating) direction from the position shown in FIGS. 21 and 22 such that the positioning ratchet and the first release member pivot in the first (releasing) direction to engage the second positioning pawl.
Figure 24:
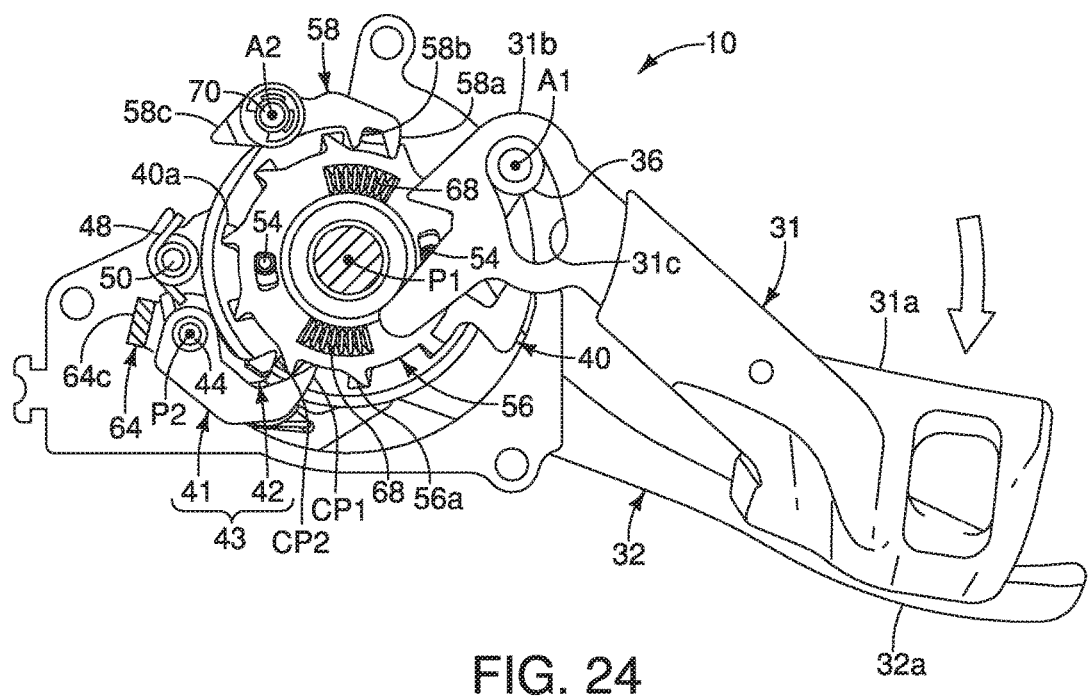
FIG. 24 is a top plan view similar to FIG. 23, of selected internal parts of the bicycle operating device illustrated in FIG. 1 but with additional parts removed.
Figure 25:
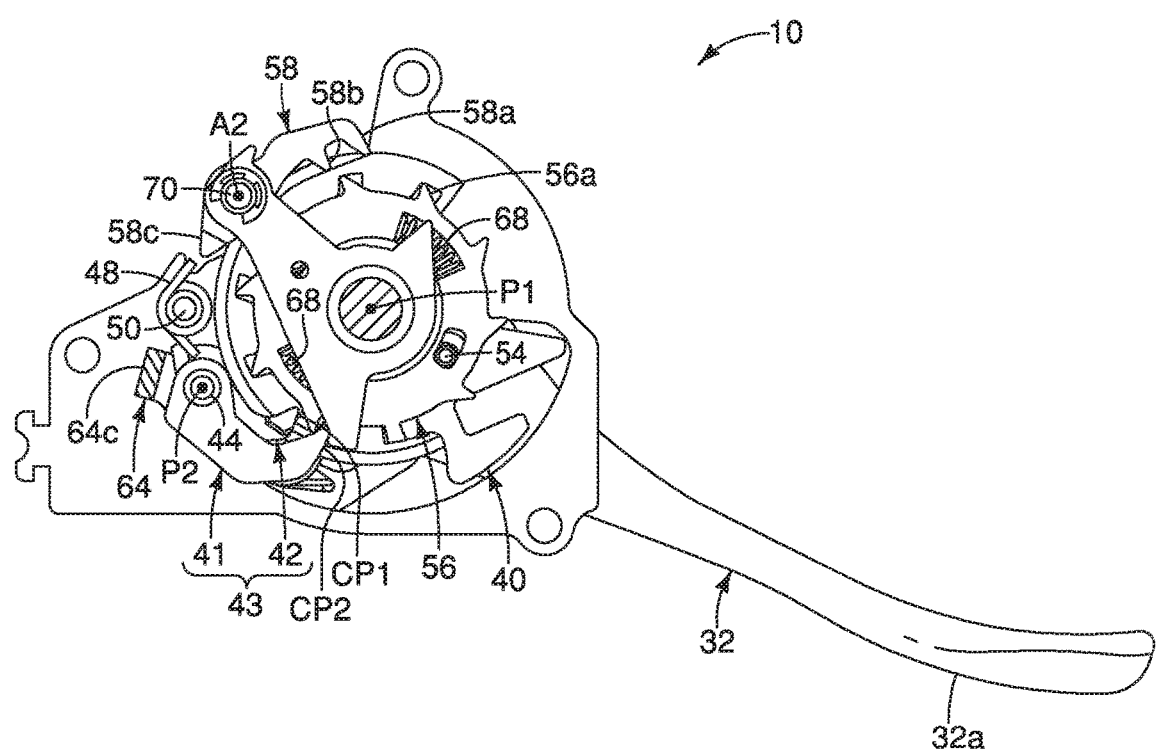
FIG. 25 is a top plan view of selected internal parts of the bicycle operating device illustrated in FIG. 1 with the first and second operating members being disposed in the first and second rest positions, respectively, and the second positioning pawl engaged with the positioning ratchet to establish one of the plurality of predetermined positions.
Figure 26:
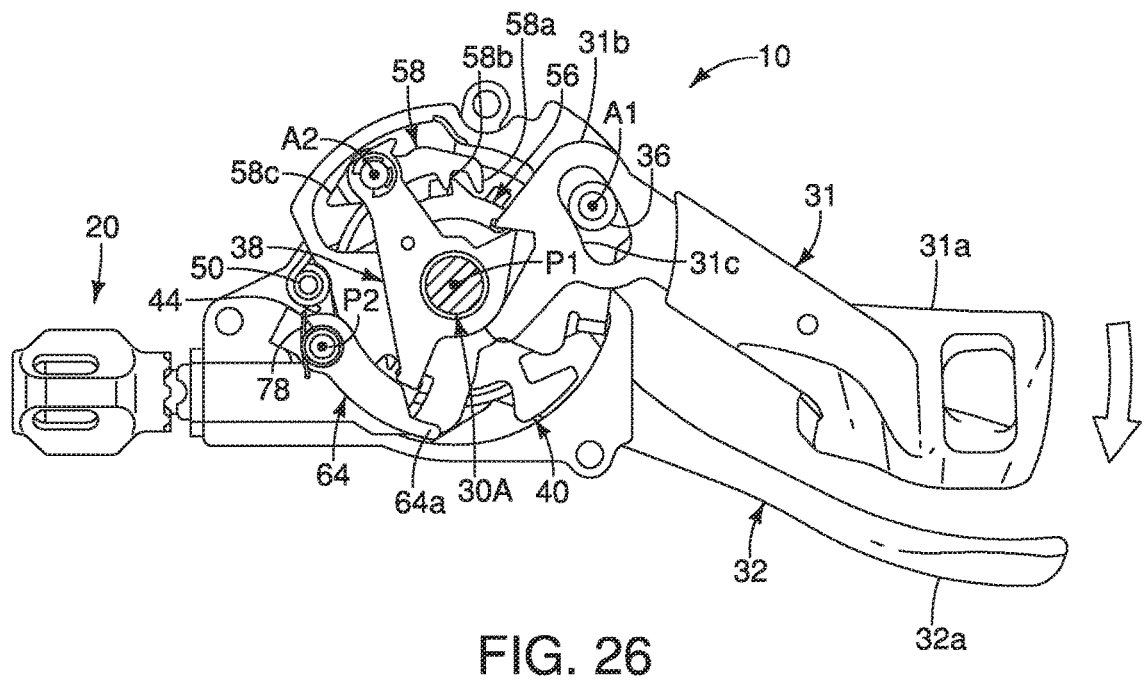
FIG. 26 is a top plan view of selected internal parts of the bicycle operating device illustrated in FIG. 1 with the first operating member moved from the first rest position to a partially actuated position for starting a releasing operation by movement of the first operating member in the first (operating) direction such that a second pawl part of the release pawl engages a release tooth of the first release member and such that the first release member pivots relative to the positioning ratchet to pivot the second positioning pawl out of engagement with the positioning ratchet and to pivot the second release member for disengaging the pulling pawl from the pulling member.
Figure 27:
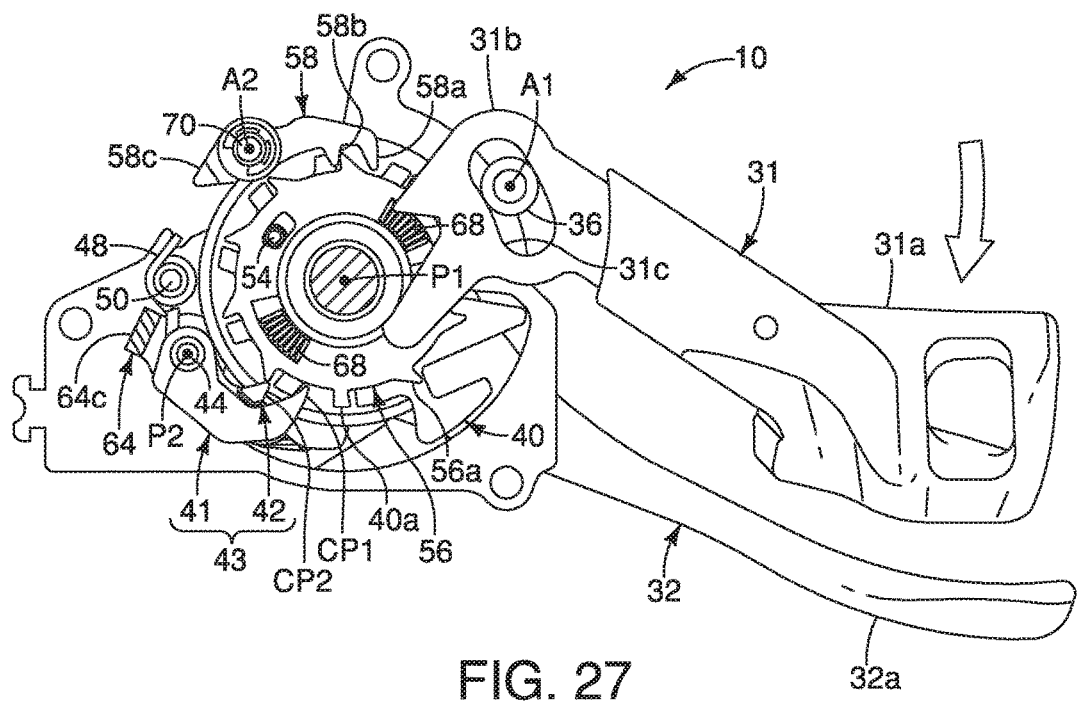
FIG. 27 is a top plan view of selected internal parts of the bicycle operating device illustrated in FIG. 1 with the first operating member moved farther in the first (operating) direction from the position shown in FIG. 26 such that the positioning ratchet pivots relative to the first release member.
Figure 28:
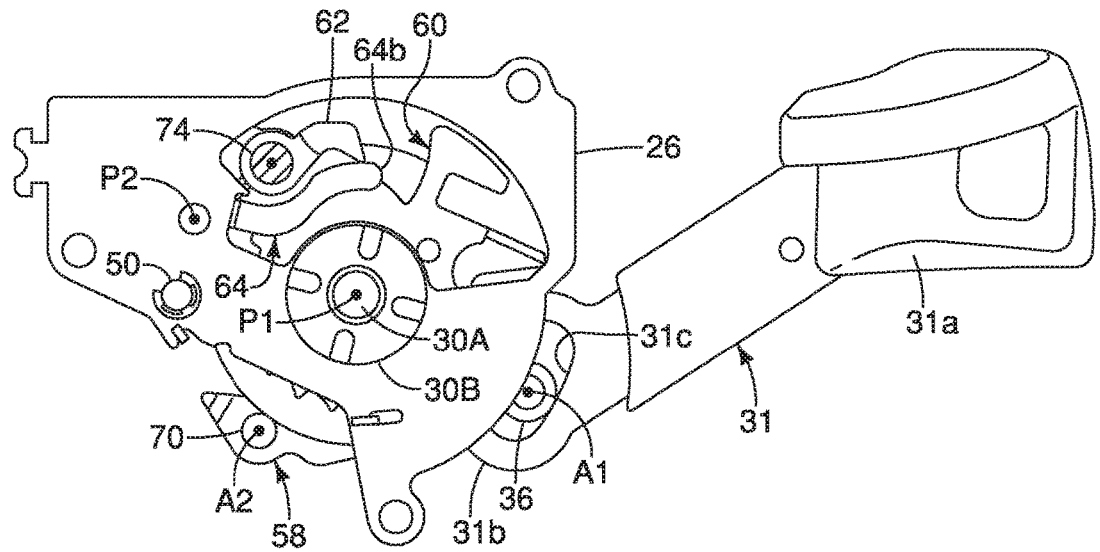
FIG. 28 is a bottom plan view of selected internal parts of the bicycle operating device illustrated in FIG. 1 with the first operating member in the actuated position shown in FIGS. 26 and 27 such that the second release member pivot the pulling pawl for disengaging the pulling pawl from the pulling member.
Figure 29:
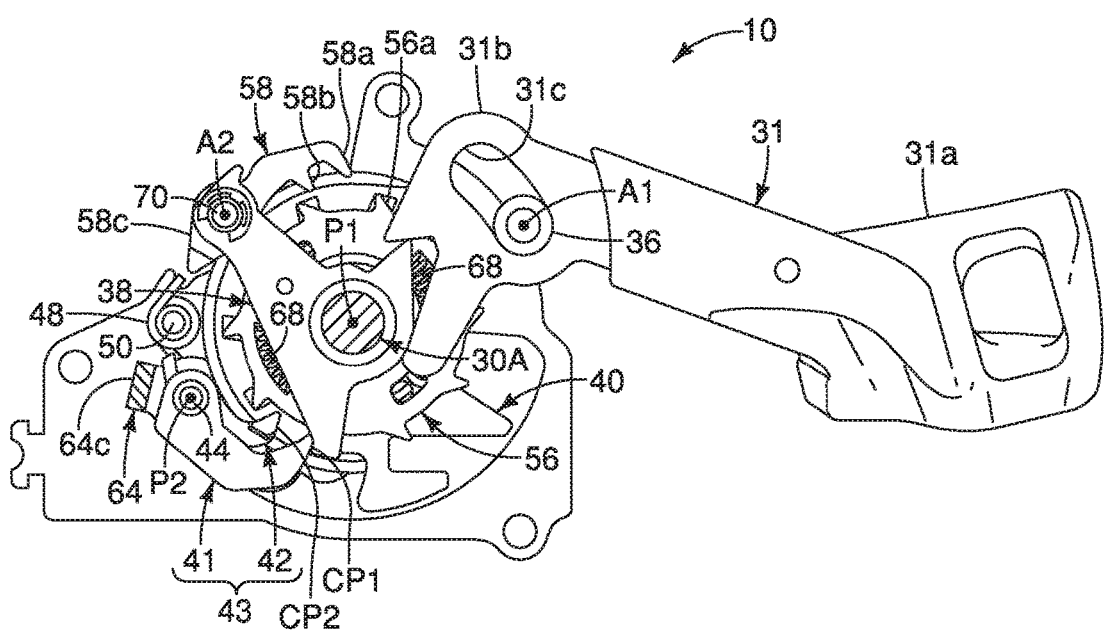
FIG. 29 is a top plan view of selected internal parts of the bicycle operating device illustrated in FIG. 1 with the first operating member moved back to the first rest position after the positioning ratchet pivots relative to the first release member and the first positioning pawl engages the positioning ratchet.
Figure 30:
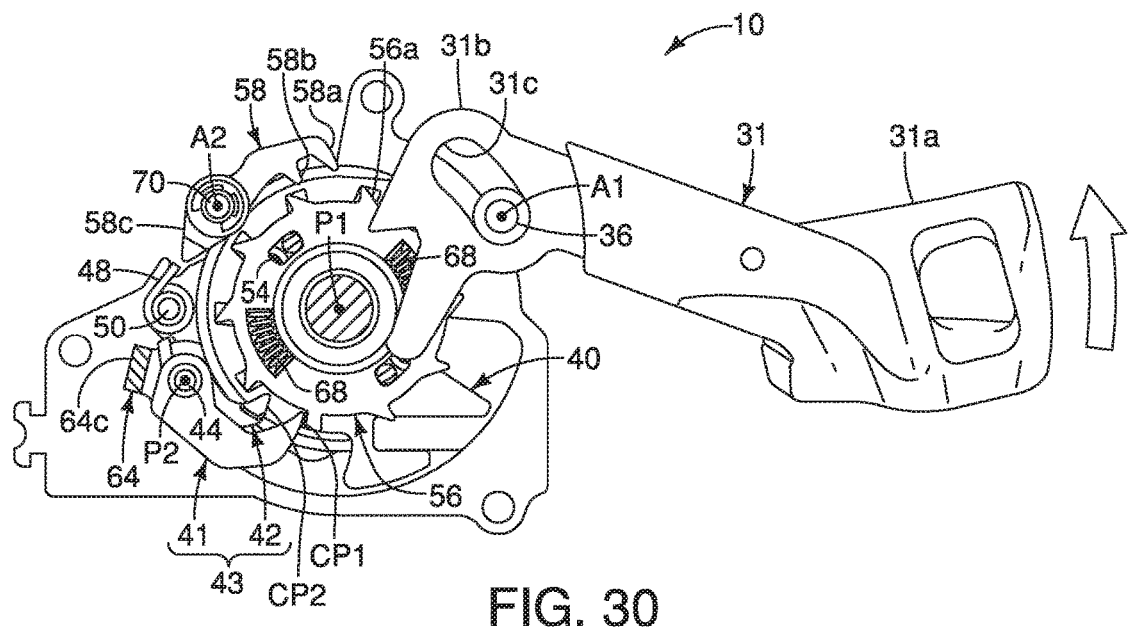
FIG. 30 is a top plan view similar to FIG. 29, of selected internal parts of the bicycle operating device illustrated in FIG. 1 but with additional parts removed.

As seen in FIG. 12, the first positioning pawl 41 prevents pivoting of the positioning ratchet 40 in the first direction D1 about the first pivot axis P1 while the first positioning pawl 41 is in the first holding position. As seen in FIGS. 20 and 22, the first positioning pawl 41 releases the positioning ratchet 40 to pivot in the first direction D1 while the first positioning pawl 41 is in the first releasing position. The first positioning pawl 41 releases the positioning ratchet 40 to pivot in the first direction D1 while the first positioning pawl 41 is in the first releasing position until the positioning ratchet 40 contacts the second positioning pawl 42. Similarly, as seen in FIG. 11, the second positioning pawl 42 prevents pivoting of the positioning ratchet 40 in the first direction D1 about the first pivot axis P1 while the second positioning pawl 42 is in the second holding position. As seen in FIGS. 27 and 28, the second positioning pawl 42 releases the positioning ratchet 40 to pivot in the first direction D1 while the second positioning pawl 42 is in the second releasing position. The second positioning pawl 42 releases the positioning ratchet 40 to pivot in the first direction D1 while the second positioning pawl 42 is in the second releasing position until the positioning ratchet 40 contacts the first positioning pawl 41.

As seen in FIG. 12, the first positioning pawl 41 includes a first contact point CP1 being configured to selectively contact the positioning ratchet 40 and prevent pivoting of the positioning ratchet 40 in the first direction D1 about the first pivot axis P1 while the first positioning pawl 41 is in the first holding position. As seen in FIG. 11, the second positioning pawl 42 includes a second contact point CP2 being configured to selectively contact the positioning ratchet 40 and prevent pivoting of the positioning ratchet 40 in the first direction D1 about the first pivot axis P1 while the second positioning pawl 42 is in the second holding position. The first and second contact points CP1 and CP2 of the first and second positioning pawls 41 and 42 alternately contact the positioning abutments 40a to prevent pivoting of the positioning ratchet 40 in the first direction D1 about the first pivot axis P1.

The first contact point CP1 is spaced in a perpendicular direction from the second (pawl) pivot axis P2 by a first linear length L1. The second contact point CP2 is spaced in a perpendicular direction from the second (pawl) pivot axis P2 by a second linear length L2. The first linear length L1 is different from the second linear length L2. The first linear length L1 is longer than the second linear length L2. The first pivot axis P1 and the second (pawl) pivot axis P2 defines a plane PL. The first contact point CP1 and the second contact point CP2 are located on a same side of the plane PL with respect to the second (pawl) pivot axis P2.

Preferably, as seen in FIG. 9, the bicycle operating device 10 further comprises a biasing element 52 that is provided for biasing the wire takeup member 35 and the positioning ratchet 40 in the first direction D1. (the wire releasing direction) with respect to the housing 14. As explained above, the positioning ratchet 40 pivots with the wire takeup member 35, and selectively cooperates with the first and second positioning pawls 41 and 42 to maintain the wire takeup member 35 in one of a plurality of predetermined positions against the biasing force of the biasing element 52. In other words, to establish the predetermined positions, the positioning abutments 40a of the positioning ratchet 40 are selectively engaged by the first and second positioning pawls 41 and 42 to hold the wire takeup member 35 and the positioning ratchet 40 from rotating under the biasing force of the biasing element 52.

In the illustrated embodiment, the biasing element 52 is a flat coil torsion spring that is coiled about the bolt 30A of the support shaft 30. Alternatively, the biasing element 52 can be eliminated and the wire takeup member 35 can be biased in the first direction D1 by a spring of the bicycle component that is operated by the bicycle operating device 10. Basically, operation of the first operating member 31 releases the wire takeup member 35 such that the biasing element 52 (i.e., a torsion spring) pivots the wire takeup member 35 in the first direction D1 as the first operating member 31 is moved by the user from the first rest position to one of the first actuated positions.

Here, as seen in FIG. 10, the wire takeup member 35 is non-movably coupled to the positioning ratchet 40 by a pair of fixing pins 54. In particular, the fixing pins 54 are disposed in two bores 35b of the wire takeup member 35 and in two bores 40b of the positioning ratchet 40 to prevent relative movement between the wire takeup member 35 and the positioning ratchet 40 around the first pivot axis P1. In this way, the wire takeup member 35 is arranged to pivot together with the positioning ratchet 40 as the positioning ratchet 40 pivots with respect to the base member 22 about the first pivot axis P1. In other words, the positioning ratchet 40 is configured to pivot with the wire takeup member 35 between the plurality of predetermined positions, which are established by selective engagement of one of the first and second positioning pawls 41 and 42 with the positioning ratchet 40. The positioning ratchet 40 also includes a cable nipple attachment portion 40c for receiving the cable nipple 12c (see FIG. 4). When the bicycle operating device 10 is a bicycle shifter, as shown, the predetermined positions of the maintaining arrangement correspond to predetermined shift positions. Thus, the positioning ratchet 40, the first positioning pawl 41 and the second positioning pawl 42 basically form the cable position maintaining mechanism of the bicycle operating device 10.

Referring to 10, to release the positioning ratchet 40 and the wire takeup member 35 for pivoting on the bolt 30A of the support shaft 30 in the first direction D1, the bicycle operating device 10 further comprises a first release member 56 and a release pawl 58. On the other hand, to pivot the positioning ratchet 40 and the wire takeup member 35 in the second direction D2, the bicycle operating device 10 further comprises a pulling member 60 and a pulling pawl 62 (see FIG. 8). The bicycle operating device 10 further comprises a second release member 64. The second release member 64 is arranged to move the pulling pawl 62 away from the pulling member 60 during a releasing operation.

Figure 5:
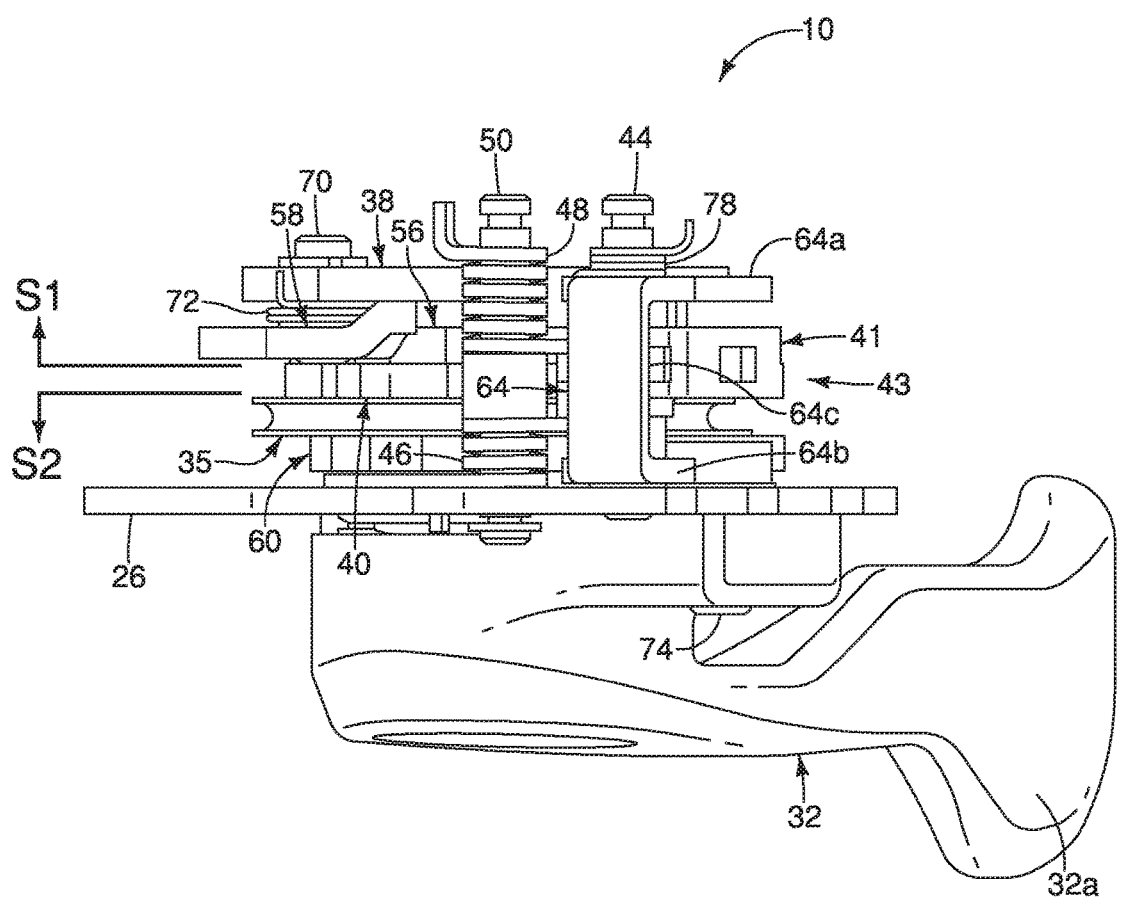
FIG. 5 is a side elevational view of selected internal parts of the bicycle operating device illustrated in FIG. 1.
Figure 6:
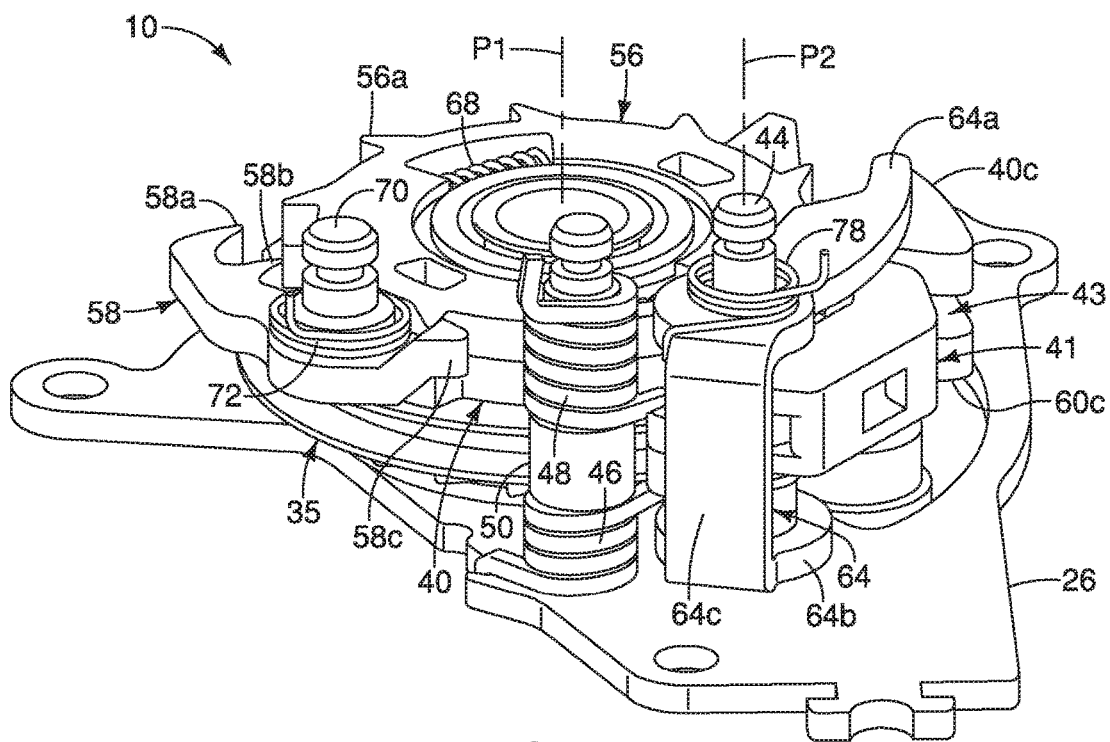
FIG. 6 is a perspective view of selected internal parts of the bicycle operating device illustrated in FIG. 1.

Referring again to FIGS. 9 and 10, the first release member 56 is basically a rigid plate that is made of a suitable material such as, for example, a metallic material. The positioning ratchet 40 is positioned between the pulling member 60 and the first release member 56 along the first pivot axis P1. Basically, the first release member 56 is movably mounted to selectively cooperate with the first and second positioning pawls 41 and 42 to release the wire takeup member 35 for rotational movement in the first direction D1 about the first pivot axis P1. The first release member 56 includes a plurality of release teeth 56a. Thus, the first release member 56 constitutes a release ratchet. The release teeth 56a are selectively engaged by the release pawl 58 to move the first release member 56 in the second direction D2 as the first operating member 31 moves from the first rest position to one of the first actuated positions. As a result, the first release member 56 is movably mounted with respect to the base member 22. As seen in FIG. 5, the first release member 56 is positioned on the first axial side S1 of the positioning ratchet 40. The first release member 56 moves the positioning member 43 from the holding position to the releasing position as the first release member 56 moves with respect to the base member 22. Specifically, the first release member 56 selectively moves the first and second positioning pawls 41 and 42 from the first and second holding positions to the first and second releasing positions, respectively, as the first release member 56 moves with respect to the base member 22.

Figure 18:
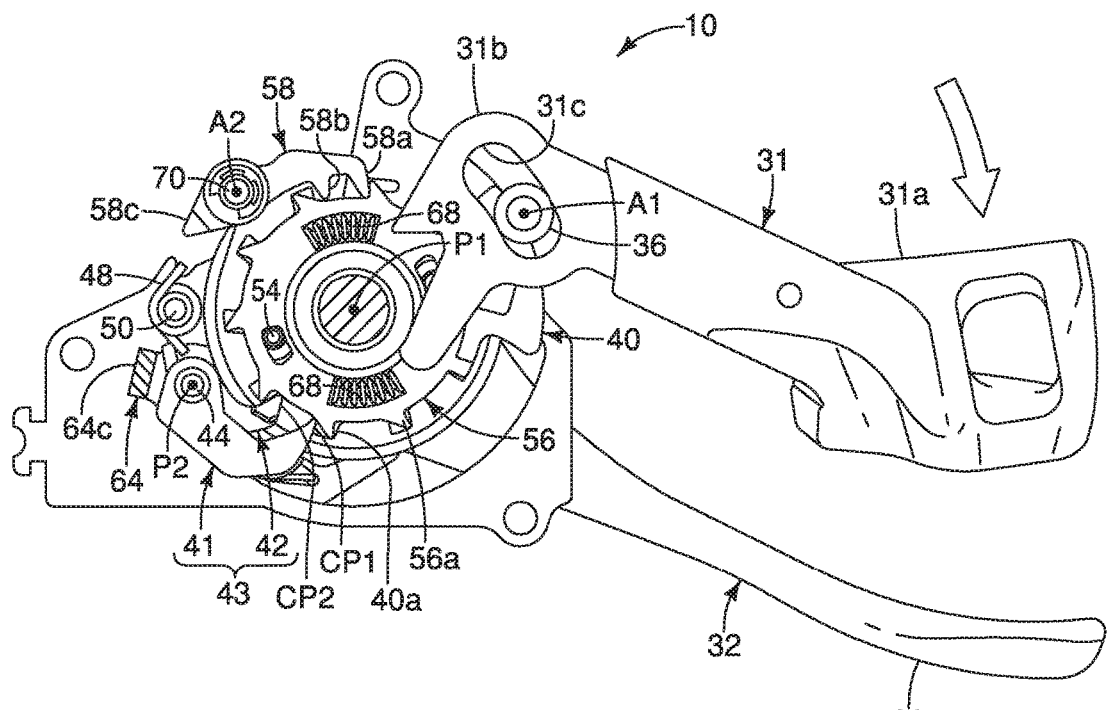
FIG. 18 is a top plan view similar to FIG. 17, of selected internal parts of the bicycle operating device illustrated in FIG. 1 but with additional parts removed.

Referring to FIGS. 18, 20 and 22, the first release member 56 is basically coupled to the positioning ratchet 40 with a small amount of rotational play between the first release member 56 and the positioning ratchet 40. Since the positioning ratchet 40 is fixed to the wire takeup member 35, the first release member 56 is movably coupled to the positioning ratchet 40 to move in the first direction D1 within a prescribed range relative to the positioning ratchet 40 between a non-release position (FIG. 18) and a release position (FIG. 20). The first release member 56 alternatively holds one of the first and second positioning pawls 41 and 42 out of engagement with the positioning abutments 40a of the positioning ratchet 40 while the first release member 56 is in the release position.

Referring to FIGS. 10 to 12, two biasing members 68 are disposed between the first release member 56 and the positioning ratchet 40 for biasing the first release member 56 to the non-release position. In the illustrated embodiment, the biasing members 68 are compression springs that are disposed in openings 40d of the positioning ratchet 40 and openings 56b of the first release member 56. The first release member 56 alternately moves the first positioning pawl 41 towards the first releasing position and moves the second positioning pawl 42 towards the second releasing position as the first release member 56 moves in the first direction D1.

Referring to FIGS. 10 to 12, the first release member 56 has a pair of arc-shaped openings 56c that mates with an upper end of the fixing pins 54. The arc-shaped openings 56c are configured so that the first release member 56 can pivot relative to the wire takeup member 35 within a prescribed range during a releasing operation of the first operating member 31 as mentioned above. Due to the biasing members 68 biasing the first release member 56 to the non-release position, the first release member 56 is configured to move in the second direction D2 in response to a rotation of the wire takeup member 35 in the second direction D2 as a result of the operation of the second operating member 32.

As seen in FIGS. 15 to 30, the release pawl 58 is movably mounted with respect to the base member 22. Specifically, the release pawl 58 is movably mounted to the first operating member 31 via the internal operating part 38 for carrying out the releasing operation as explained below. In the illustrated embodiment, the first operating member 31 pivots the internal operating part 38 to selectively move the release pawl 58 as the internal operating part 38 moves from the rest position to the actuated position. The release pawl 58 then pivots the first release 56 about the first pivot axis P1. Thus, the internal operating part 38 moves the release pawl 58 as the internal operating part 38 moves from the rest position to the actuated position. In this way, the internal operating part 38 is configured to move the release pawl 58 as the internal operating part 38 moves with respect to the base member 22. As a result, the release pawl 58 moves the first release member 56 as the release pawl 58 moves with respect to the base member 22.

In the illustrated embodiment, as seen in FIG. 10, the release pawl 58 includes a first pawl part 58a and a second pawl part 58b. The first and second pawl parts 58a and 58b are configured to selectively contact with the first release member 56 as the release pawl 58 moves with respect to the base member 22. The release pawl 58 is pivotally mounted with respect to the internal operating part 38 about a release pivot axis A2. In the illustrated embodiment, the release pawl 58 is pivotally mounted on the internal operating part 38 by a pivot pin 70 that defines the release pivot axis A2 which is parallel to the first pivot axis P1, the second pivot axis P2 and the operating axis A1. As a result, the release pawl 58 is pivotally mounted with respect to the base member 22 about the first pivot axis P1. Basically, the release pawl 58 is configured to move the first release member 56 from the non-release position to the release position as the first operating member 31 moves from the first rest position to the first actuated position.

Preferably, as in the illustrated embodiment, the release pawl 58 is biased by a biasing element 72 (e.g., a coil torsion spring) radially towards the first pivot axis P1. Thus, the release pawl 58 is biased by the biasing element 72 so as to engage with the release teeth 56a upon movement of the first operating member 31 from the first rest position to the first actuated position. However, the release pawl 58 is held disengaged from the release teeth 56a while the first operating member 31 is in the first rest position. In particular, an abutment 58c of the release pawl 58 is pushed against the middle stationary support plate 28 by the biasing force of the first biasing element 33 so as to pivot the release pawl 58 outwardly from the release teeth 56a while the first operating member 31 is in the first rest position. In other words, the abutment 58c (FIG. 15) of the release pawl 58 is forced into contact with the middle stationary support plate 28 by the biasing force of the first biasing element 33 acting on the internal operating part 38. According to this contact, while the first operating member 31 is in the first rest position, the release pawl 58 is pivoted outwardly on the pivot pin 70 away from the first release member 56.

Here, the second pawl part 58b is circumferentially spaced from the first pawl part 58a with respect to the first pivot axis P1. Thus, the first pawl part 58a and the second pawl part 58b are different from each other. The first release member 56 moves the first positioning pawl 41 from the first holding position to the first releasing position while the first pawl part 58a contacts the first release member 56 and the release pawl 58 moves the first release member 56 from the non-release position to the release position. The first release member 56 moves the second positioning pawl 42 from the second holding position to the second releasing position while the second pawl part 58b contacts the first release member 56 and the release pawl 58 moves the first release member 56 from the non-release position to the release position.

One of the release teeth 56a is configured to contact with the first pawl part 58a of the release pawl 58 and the second pawl part 58b of the release pawl 58. The one of the release teeth 56a is configured to contact with the first positioning pawl 41 and the second positioning pawl 42.

Figure 31:
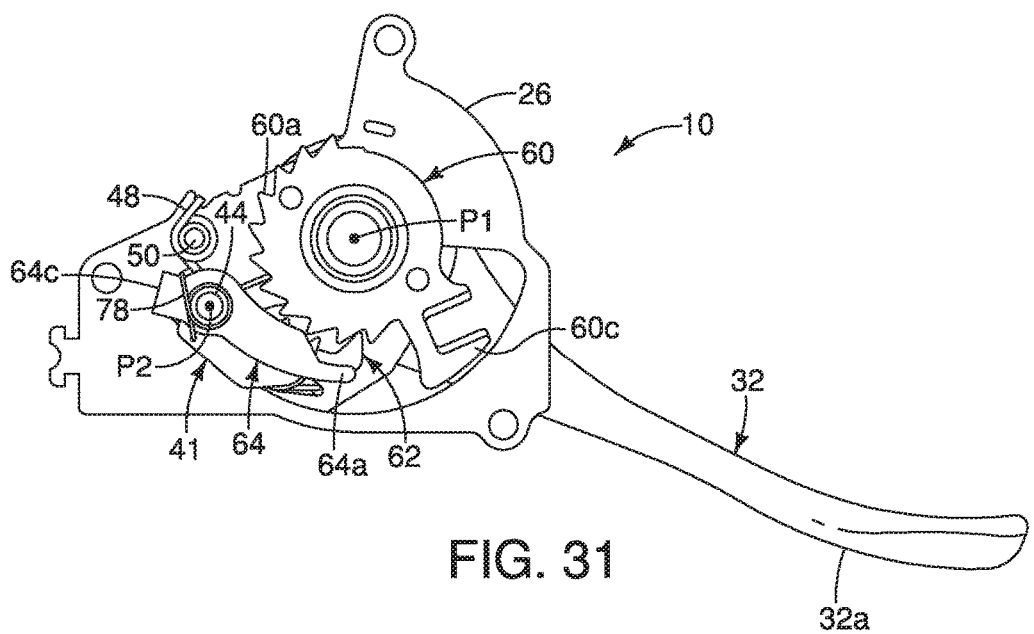
FIG. 31 is a top plan view of selected internal parts of the bicycle operating device illustrated in FIG. 1 with the second operating member in the second rest position.
Figure 32:
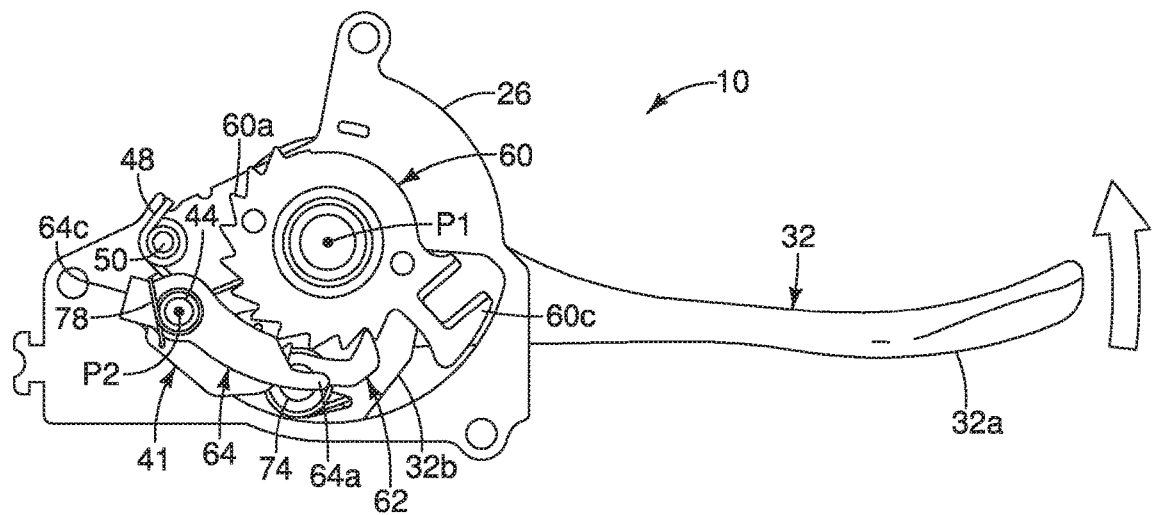
FIG. 32 is a top plan view, similar to FIG. 31, of selected internal parts of the bicycle operating device illustrated in FIG. 1 with the second operating member moved from the second rest position to start a pulling operation.
Figure 33:
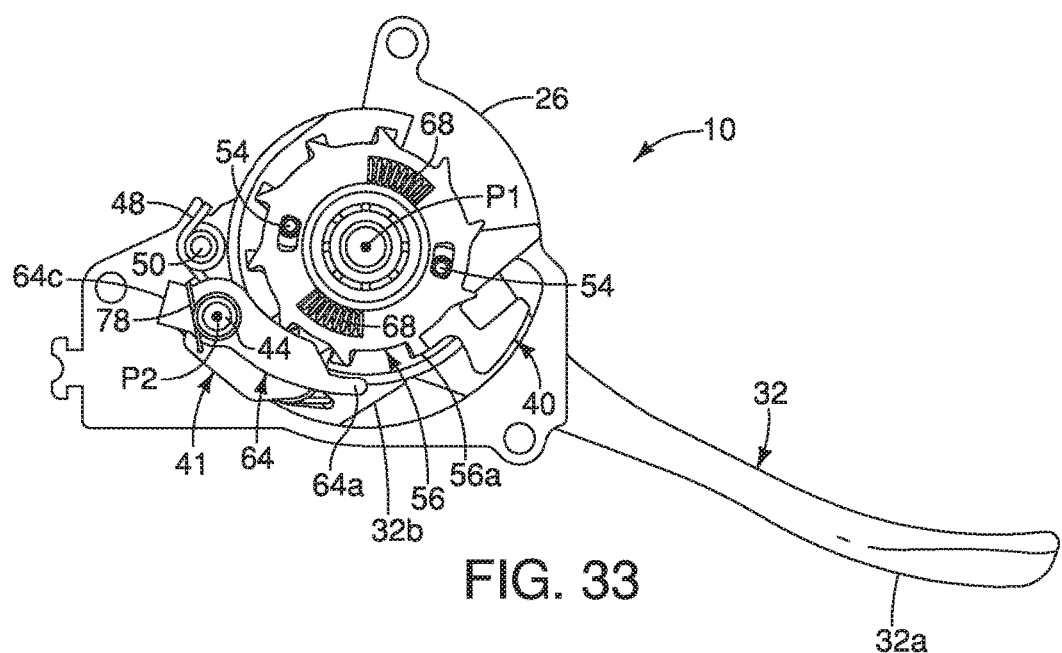
FIG. 33 is a top plan view of selected internal parts of the bicycle operating device illustrated in FIG. 1 but with the second operating member moved back to the second rest position from the second actuated position shown in FIG. 32 with the wire takeup member and the positioning ratchet in another one of the plurality of predetermined positions.

Now, the pulling member 60 and the pulling pawl 62 will be discussed for performing a wire pulling operation, which is shown in FIGS. 31 to 33. First, referring to FIGS. 8, 13 and 14, the pulling member 60 is movably mounted with respect to the base member 22. Specifically, the pulling member 60 is pivotally mounted on the bolt 30A of the support shaft 30 to pivot with respect to the base member 22. As seen in FIG. 8, the pulling pawl 62 is movably mounted on the second operating member 32. In particular, the second operating member 32 movably supports the pulling pawl 62 to pull the inner wire 12b into the housing 14 by pivoting the pulling member 60. The pulling member 60 pivots the positioning ratchet 40 in the second direction D2 as the pulling member 60 moves with respect to the base member 22.

The pulling member 60 includes a plurality of pulling teeth 60a that are selectively engaged by the pulling pawl 62. Thus, the pulling member 60 constitutes a pulling ratchet. The pulling member 60 also includes a cable nipple attachment portion 60c for receiving the cable nipple 12c (see FIG. 4). During operation of the second operating member 32, the pulling pawl 62 engages the pulling teeth 60a and pivots the positioning ratchet 40 and the wire takeup member 35 in the second direction D2 (the wire pulling direction) as the second operating member 32 moves from the second rest position to the second actuated position. In particular, the pulling member 60 is fixed to the positioning ratchet 40 by the fixing pins 54 which extend into a pair of bores 60d of the pulling member 60 (see FIG. 10). As a result, the positioning ratchet 40 and the pulling member 60 move together as a unit about the first pivot axis P1.

Since the pulling member 60 is attached to the positioning ratchet 40, the biasing element 52 biases the wire takeup member 35, the positioning ratchet 40 and the pulling member 60 in the first direction D1. A first end part 52a of the biasing element 52 is attached to the bottom stationary support plate 26 (i.e., hooked onto a portion of the bottom stationary support plate 26 in the case of the illustrated embodiment). A second end part 52b of the biasing element 52 is operatively coupled to the wire takeup member 35 (i.e., disposed in a hole of the pulling member 60, which is non-movably attached to the bottom of the wire takeup member 35 in the case of the illustrated embodiment).

Figure 13:
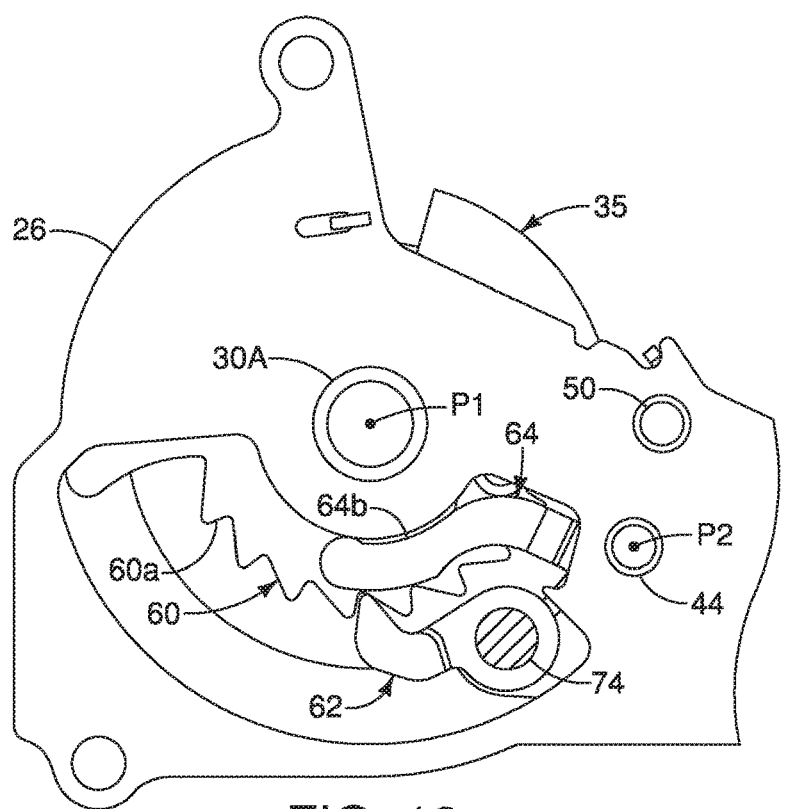
FIG. 13 is a bottom plan view of selected internal parts of the bicycle operating device illustrated in FIG. 1 that shows engagement of a pulling pawl with a pulling member when the first and second operating members are disposed in the first and second rest positions, respectively.
Figure 14:
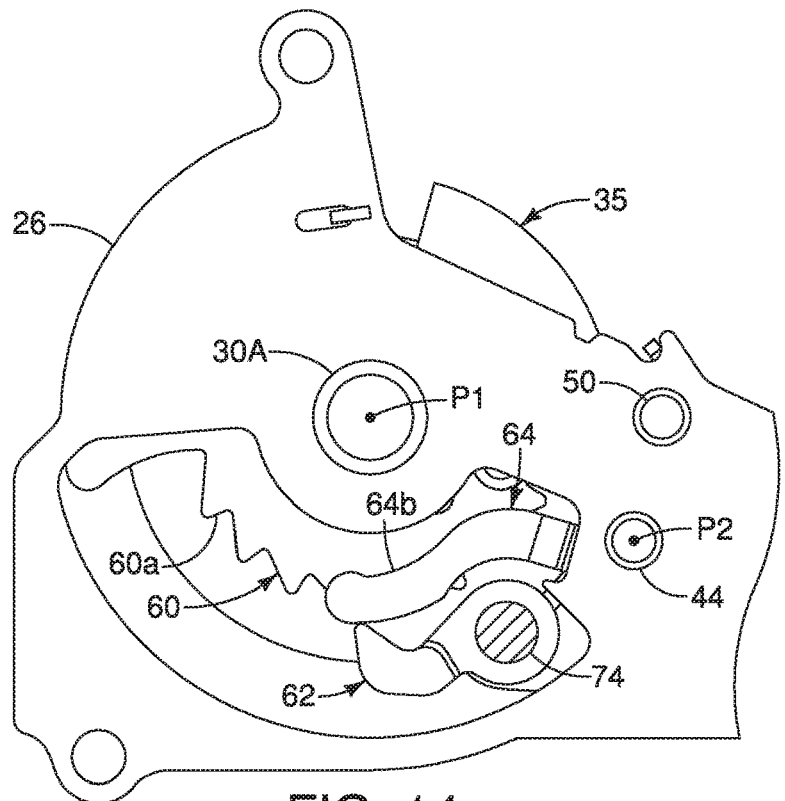
FIG. 14 is a bottom plan view, similar to FIG. 13, of selected internal parts of the bicycle operating device illustrated in FIG. 1 that shows the pulling pawl disengaged from the pulling member when the first operating member is in a first actuated position and the second operating member is in the second rest position.

As seen in FIGS. 8, 13 and 14, the pulling pawl 62 is pivotally mounted on the second operating member 32 by a pivot pin 74 that is mounted to the second operating member 32. The bicycle operating device 10 further comprises a biasing element 76. The biasing element 76 biases the pulling pawl 62 toward engagement with the pulling member 60. Here, the biasing element 76 is a coil torsion spring that is mounted on the pivot pin 74 and biases the pulling pawl 62 radially towards the first pivot axis P1. The pulling pawl 62 is biased to engage one of the pulling teeth 60a of the pulling member 60 while the first and second operating members 31 and 32 are in the first and second rest positions, respectively, as seen in FIG. 13. However, the pulling pawl 62 can be biased to contact and held on the second release member 64 between a pair of the pulling teeth 60a of the pulling member 60 while the first and second operating members 31 and 32 are in the first and second rest positions, respectively. The pulling pawl 62 is disengaged from the pulling teeth 60a of the pulling member 60 as the first operating member 31 moves from the first rest position toward the first actuated position as seen in FIG. 14 and as explained below.

As the second operating member 32 is pivoted in the second direction D2 to perform a pulling operation of the inner wire 12b, the pulling pawl 62 is moved into contact with the pulling member 60 to pivot the pulling member 60 and the positioning ratchet 40 with respect to the base member 22 in the second direction D2 as the second operating member 32 moves from the second rest position to the second actuated position. In other words, the pulling pawl 62 contacts the pulling member 60 and moves the pulling member 60 as the second operating member 32 moves from the second rest position to the second actuated position. In this way, the pulling pawl 62 contacts the pulling member 60 and moves the pulling member 60 as the pulling pawl 62 moves with respect to the base member 22. Thus, as the second operating member 32 performs a pulling operation of the inner wire 12b, the pulling pawl 62 will pivot the pulling member 60 in the second direction D2. As a result, the positioning ratchet 40 and the wire takeup member 35 move together in the second direction D2 as the second operating member 32 moves from the second rest position (e.g., see FIGS. 31 and 33) to the second actuated position (e.g., see FIG. 32).

However, when the first operating member 31 is moved to one of the first actuated positions, the second release member 64 will move the pulling pawl 62 out of engagement with the pulling teeth 60a of the pulling member 60. In particular, the pulling pawl 62 is pivoted outwardly on the pivot pin 74 by the second release member 64 during operation of the first operating member 31 so that the pulling pawl 62 does not interfere with the releasing operation.

Now referring to FIGS. 10 to 12, 15, 17 and 19, the second release member 64 will be discussed for moving the pulling pawl 62 out of engagement from the pulling teeth 60a of the pulling member 60 so that the pulling pawl 62 does not interfere with the releasing operation. Basically, the second release member 64 is movably mounted with respect to the base member 22. More specifically, the second release member 64 is pivotally mounted with respect to the base member 22 about the second pivot axis P2. In other words, the second release member 64 is pivotally supported on the pivot pin 44, which also supports the positioning member 43. In the illustrated embodiment, the second release member 64 is pivotally supported on the pivot pin 44, which also supports the first and second positioning pawls 41 and 42. The internal operating part 38 moves the second release member 64 which in turn moves the pulling pawl 62 away from the pulling member 60 as the internal operating part 38 moves from the rest position to the actuated position. In other words, the second release member 64 moves the pulling pawl 62 away from the pulling member 60 as the second release member 64 moves with respect to the base member 22.

In the illustrated embodiment, the second release member 64 includes a first end part 64a and a second end part 64b. The second release member 64 further includes a connecting part 64c that interconnects the first second end parts 64a and 64b. Here, the second release member 64 is a one-piece member made from a single piece of material. For example, the second release member 64 can be a metallic member that is bent into a U-shaped member as in the illustrated embodiment. The bicycle operating device 10 further comprises a biasing element 78 that is provided for biasing the second release member 64 towards the first pivot axis P1. The biasing element 78 is a torsion spring that is coiled about the pivot pin 44. A first end part of the biasing element 78 is attached to (i.e., hooked onto) the second release member 64, while a second end part of the biasing element 78 is attached to (i.e., hooked onto) the top stationary support plate 24.

Figure 15:
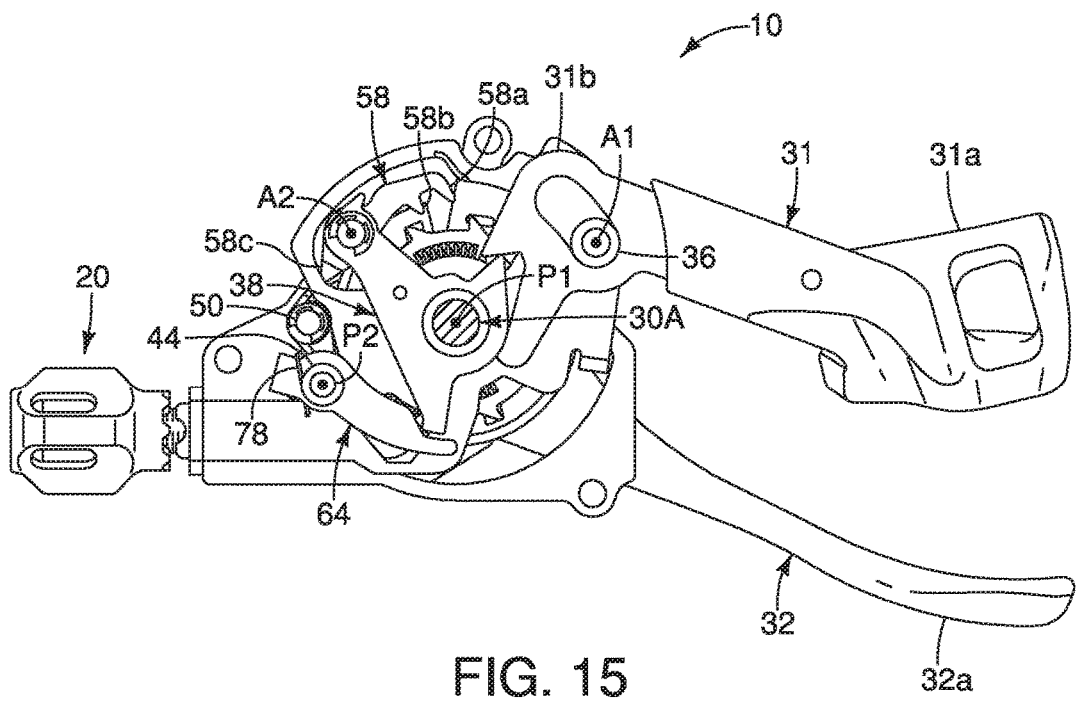
FIG. 15 is a top plan view of selected internal parts of the bicycle operating device illustrated in FIG. 1 with the first and second operating members being disposed in the first and second rest positions, respectively.
Figure 16:
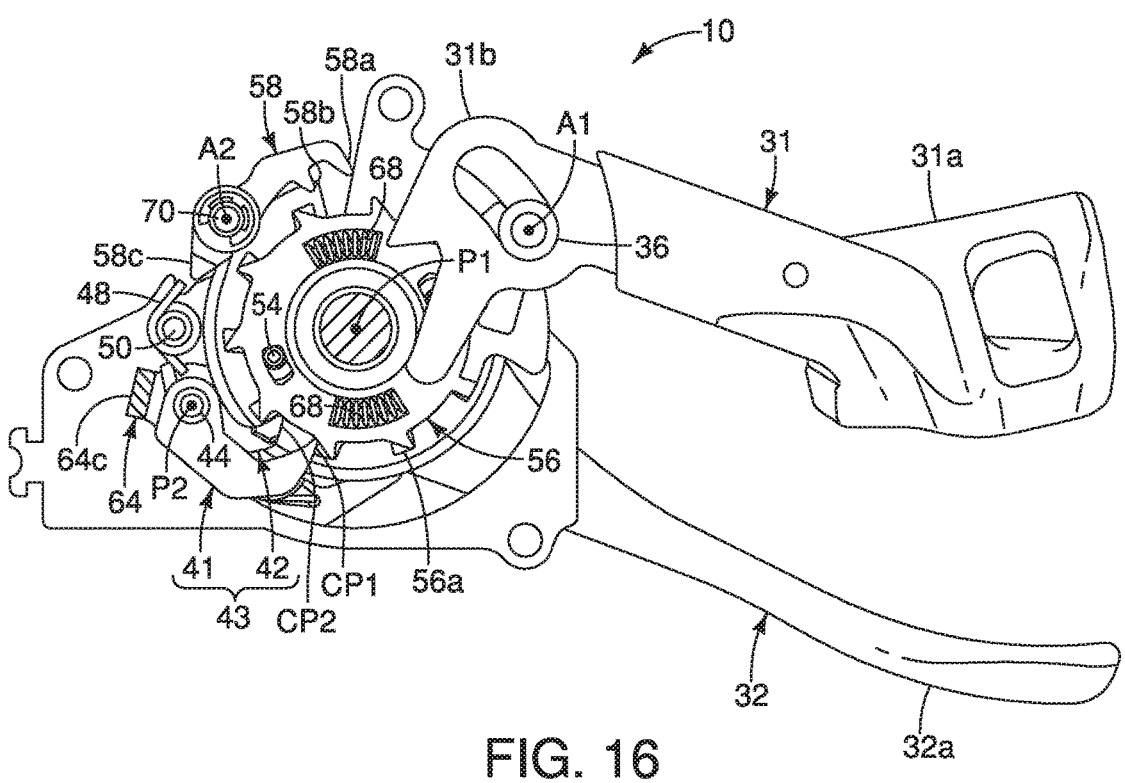
FIG. 16 is a top plan view of selected internal parts of the bicycle operating device illustrated in FIG. 1 with the first and second operating members being disposed in the first and second rest positions, respectively.
Figure 17:
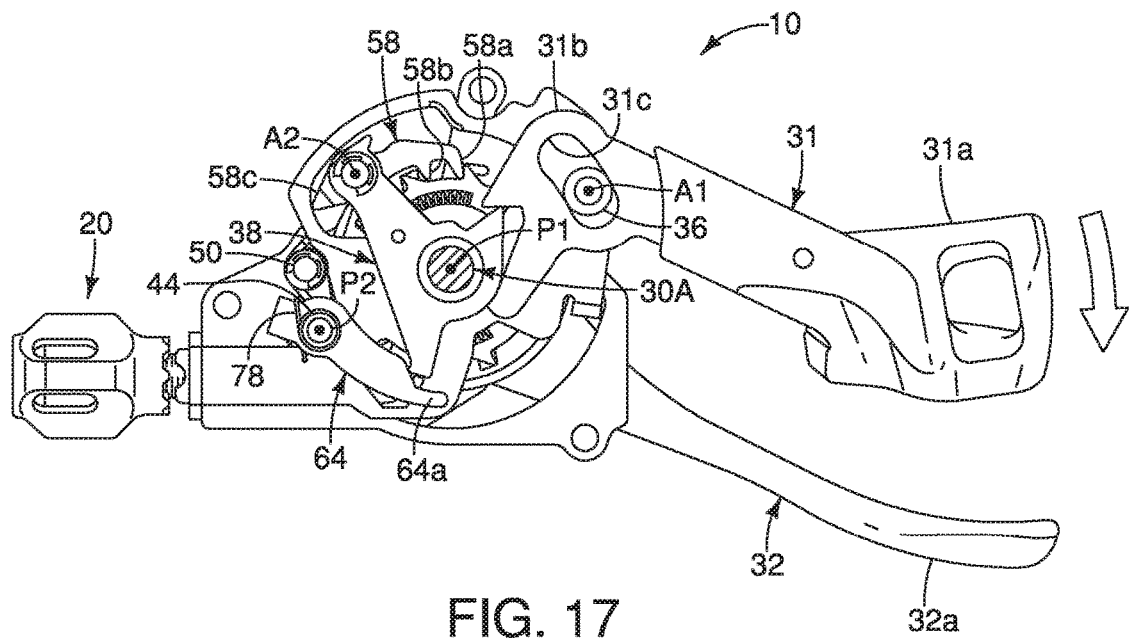
FIG. 17 is a top plan view of selected internal parts of the bicycle operating device illustrated in FIG. 1 with the first operating member moved from the first rest position to a partially actuated position for starting a releasing operation by movement of the first operating member in a first (operating) direction such that a first pawl part of a release pawl engages a release tooth of a first release member.
Figure 19:
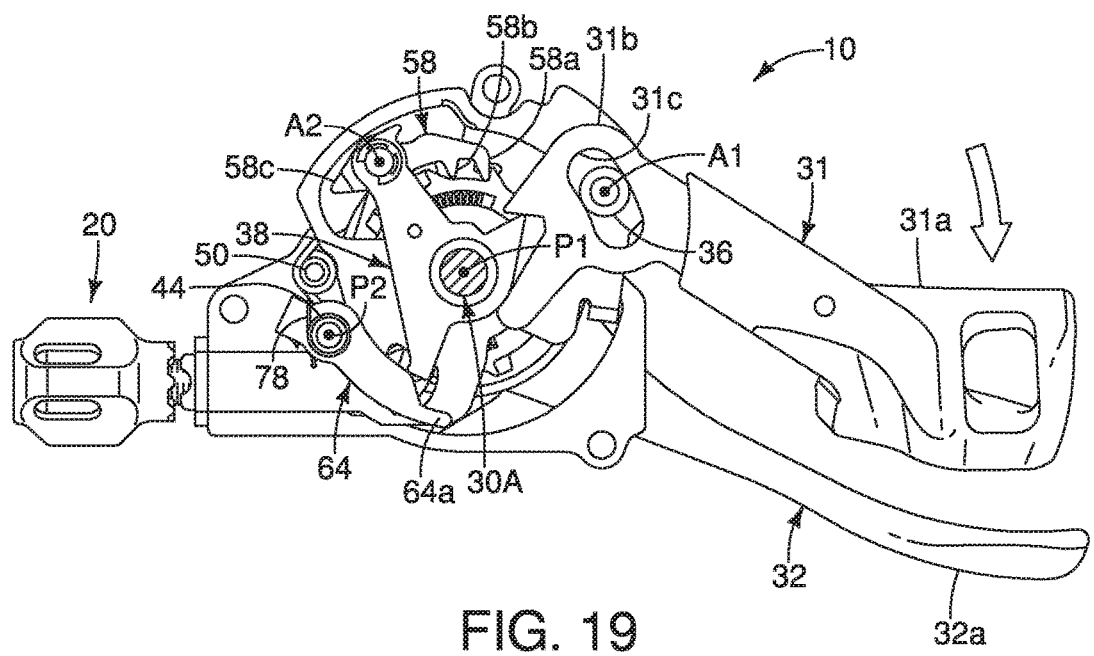
FIG. 19 is a top plan view of selected internal parts of the bicycle operating device illustrated in FIG. 1 with the first operating member moved farther in the first (operating) direction from the position shown in FIGS. 17 and 18 such that the first release member is pivoted relative to the positioning ratchet to pivot the first positioning pawl out of engagement with the positioning ratchet and to pivot the second release member for disengaging the pulling pawl from the pulling member.

As seen in FIGS. 15, 17 and 19, the first end part 64a is configured to contact the internal operating part 38. In this way, operation of the first operating member 31 pivots the internal operating part 38 which in turn pivots the second release member 64. The second end part 64b is configured to contact the pulling pawl 62. In other words, the second end part 64b of the second release member 64 moves the pulling pawl 62 out of engagement with the pulling teeth 60a as the first release member 56 moves by movement of the first operating member 31 from the first rest position to the first actuated position. The first end part 64a and the second end part 64b are offset from each other in an axial direction parallel to the first pivot axis P1. Thus, in the illustrated embodiment, as seen in FIG. 5, the second release member 64 extends from a first axial side S1 of the positioning ratchet 40 to a second axial side S2 of the positioning ratchet 40. Also, the pulling member 60 is positioned on the second axial side S2 of the positioning ratchet 40.

Thus, with this arrangement, the pulling pawl 62 is held in a disengaged position from the pulling teeth 60a while the first operating member 31 is in the first actuated position. In other words, while the first operating member 31 is in the first actuated position, the pulling pawl 62 is pivoted outwardly on the pivot pin 74 during operation of the first operating member 31 so that the pulling pawl 62 does not interfere with the releasing operation of the wire takeup member 35.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up" "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
a base member;
a positioning ratchet pivotally mounted with respect to the base member about a pivot axis, the positioning ratchet being configured to pivot in a first direction and a second direction that is opposite to the first direction;
a positioning member movably mounted with respect to the base member between a holding position and a releasing position, the positioning member preventing pivoting of the positioning ratchet in the first direction about the pivot axis while the positioning member is in the holding position, the positioning member releasing the positioning ratchet to pivot in the first direction while the positioning member is in the releasing position;

a release member movably mounted with respect to the base member, the release member moving the positioning member from the holding position to the releasing position as the release member moves with respect to the base member; and a release pawl movably mounted with respect to the base member, the release pawl being configured to move the release member, the release pawl including a first pawl part and a second pawl part, the first and second pawl parts being configured to selectively contact with the release member as the release pawl moves with respect to the base member, the first pawl part and the second pawl part being different from each other.

2. The bicycle operating device according to claim 1, wherein the positioning member includes a first positioning pawl and a second positioning pawl;

the first positioning pawl is movably mounted with respect to the base member between a first holding position and a first releasing position;

the first positioning pawl prevents pivoting of the positioning ratchet in the first direction about the pivot axis while the first positioning pawl is in the first holding position;

the first positioning pawl releases the positioning ratchet to pivot in the first direction while the first positioning pawl is in the first releasing position;

the second positioning pawl is movably mounted with respect to the base member between a second holding position and a second releasing position;

the second positioning pawl prevents pivoting of the positioning ratchet in the first direction about the pivot axis while the second positioning pawl is in the second holding position; and the second positioning pawl releases the positioning ratchet to pivot in the first direction while the second positioning pawl is in the second releasing position.

3. The bicycle operating device according to claim 2, wherein the release member moves the first positioning pawl from the first holding position to the first releasing position while the first pawl part contacts the release member and the release pawl moves the release member from a non-release position to a release position.

4. The bicycle operating device according to claim 3, wherein the release member moves the second positioning pawl from the second holding position to the second releasing position while the second pawl part contacts the release member and the release pawl moves the release member from a non-release position to a release position.

5. The bicycle operating device according to claim 2, wherein the release member includes a plurality of release teeth, one of the release teeth being configured to contact with the first pawl part of the release pawl and the second pawl part of the release pawl; and the one of the release teeth is configured to contact with the first positioning pawl and the second positioning pawl.

6. The bicycle operating device according to claim 2, wherein the first positioning pawl and the second positioning pawl are configured to move independently of each other.

7. The bicycle operating device according to claim 2, wherein the first positioning pawl is pivotally mounted with respect to the base member about a pawl pivot axis.

8. The bicycle operating device according to claim 7, wherein the second positioning pawl is pivotally mounted with respect to the base member about the pawl pivot axis.

9. The bicycle operating device according to claim 2, further comprising:

at least one biasing member biasing the first positioning pawl toward the first holding position, and biasing the second positioning pawl toward the second holding position.

10. The bicycle operating device according to claim 9, wherein the at least one biasing member includes a first biasing member biasing the first positioning pawl toward the first holding position, and a second biasing member biasing the second positioning pawl toward the second holding position.

11. The bicycle operating device according to claim 2, wherein the positioning ratchet includes a plurality of positioning abutments circumferentially arranged with respect to the pivot axis, the first and second positioning pawls alternately contact the positioning abutments to prevent pivoting of the positioning ratchet in the first direction about the pivot axis.

12. The bicycle operating device according to claim 1, wherein the second pawl part is circumferentially spaced from the first pawl part with respect to the pivot axis.

13. The bicycle operating device according to claim 1, wherein the release member includes a plurality of release teeth, one of the release teeth being configured to contact with the first pawl part of the release pawl and the second pawl part of the release pawl.

14. The bicycle operating device according to claim 1, wherein the release pawl is pivotally mounted with respect to the base member about the pivot axis.

15. The bicycle operating device according to claim 14, further comprising:

an operating part pivotally mounted with respect to the base member about the pivot axis, the release pawl is pivotally mounted with respect to the operating part about a release pivot axis.

16. The bicycle operating device according to claim 1, further comprising:

a wire takeup member arranged to pivot together with the positioning ratchet as the positioning ratchet pivots with respect to the base member about the pivot axis.

17. The bicycle operating device according to claim 1, further comprising:

a first operating member operatively coupled to the positioning member to selectively move the positioning member from the holding position to the releasing position as the first operating member moves from a first rest position to a first actuated position.

18. The bicycle operating device according to claim 17, further comprising:

a second operating member operatively coupled to the positioning ratchet to pivot the positioning ratchet with respect to the base member in the second direction as the second operating member moves from a second rest position to a second actuated position.

19. The bicycle operating device according to claim 18, further comprising:
   a pulling member movably mounted with respect to the base member, the pulling member pivoting the positioning ratchet in the second direction as the pulling member moves with respect to the base member; and
   a pulling pawl movably mounted on the second operating member, the pulling pawl contacting the pulling member and moving the pulling member as the second operating member moves from the second rest position to the second actuated position.

\* \* \* \* \*